(12) United States Patent
Huppenthal et al.

(10) Patent No.: US 7,225,324 B2
(45) Date of Patent: May 29, 2007

(54) MULTI-ADAPTIVE PROCESSING SYSTEMS AND TECHNIQUES FOR ENHANCING PARALLELISM AND PERFORMANCE OF COMPUTATIONAL FUNCTIONS

(75) Inventors: Jon M. Huppenthal, Colorado Springs, CO (US); David E. Caliga, Colorado Springs, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 550 days.

(21) Appl. No.: 10/285,318

(22) Filed: Oct. 31, 2002

(65) Prior Publication Data

US 2004/0088527 A1    May 6, 2004

(51) Int. Cl.
*G06F 17/00* (2006.01)
(52) U.S. Cl. .................................................. 712/226
(58) Field of Classification Search ................ 712/15, 712/19, 226, 215
See application file for complete search history.

(56) References Cited

U.S. PATENT DOCUMENTS

| | | | |
|---|---|---|---|
| 4,727,503 A | | 2/1988 | McWhirter |
| 4,872,133 A | * | 10/1989 | Leeland ..................... 708/509 |
| 4,962,381 A | * | 10/1990 | Helbig, Sr. ................ 342/372 |
| 5,020,059 A | | 5/1991 | Gorin et al. |
| 5,072,371 A | * | 12/1991 | Benner et al. ................ 712/11 |
| 5,230,057 A | | 7/1993 | Shido et al. |
| 5,274,832 A | * | 12/1993 | Khan ......................... 708/424 |
| 5,471,627 A | | 11/1995 | Means et al. |
| 5,477,221 A | | 12/1995 | Chang et al. |
| 5,570,040 A | | 10/1996 | Lytle et al. |
| 5,640,586 A | * | 6/1997 | Pechanek et al. ............. 712/13 |
| 5,737,766 A | | 4/1998 | Tan |
| 5,784,108 A | * | 7/1998 | Skaletzky et al. ...... 375/240.15 |
| 5,892,962 A | | 4/1999 | Cloutier |
| 5,903,771 A | | 5/1999 | Sgro et al. |
| 5,915,123 A | * | 6/1999 | Mirsky et al. ................ 712/16 |
| 5,956,518 A | * | 9/1999 | DeHon et al. ................ 712/15 |
| 6,023,755 A | | 2/2000 | Casselman |
| 6,052,773 A | | 4/2000 | DeHon et al. |
| 6,061,706 A | * | 5/2000 | Gai et al. .................... 708/491 |
| 6,076,152 A | | 6/2000 | Huppenthal et al. |
| 6,192,439 B1 | | 2/2001 | Grunewald et al. |
| 6,215,898 B1 | * | 4/2001 | Woodfill et al. ............. 382/154 |
| 6,226,776 B1 | | 5/2001 | Panchul et al. |
| 6,289,440 B1 | * | 9/2001 | Casselman .................. 712/227 |
| 6,385,757 B1 | * | 5/2002 | Gupta et al. .................... 716/1 |

OTHER PUBLICATIONS

Rosenberg, J. M., Dictionary of Computers, Information Processing & Telecommunications, 1984, John Wiley&Sons, 2ed, pp. 496.*

(Continued)

*Primary Examiner*—Eric Coleman
(74) *Attorney, Agent, or Firm*—William J. Kubida; Michael C. Martensen; Hogan & Hartson LLP

(57) ABSTRACT

Multi-adaptive processing systems and techniques for enhancing parallelism and performance of computational functions are disclosed which can be employed in a myriad of applications including multi-dimensional pipeline computations for seismic applications, search algorithms, information security, chemical and biological applications, filtering and the like as well as for systolic wavefront computations for fluid flow and structures analysis, bioinformatics etc. Some applications may also employ both the multi-dimensional pipeline and systolic wavefront methodologies disclosed.

52 Claims, 20 Drawing Sheets

OTHER PUBLICATIONS

Agarwal, A., et al., "The Raw Compiler Project", pp. 1-12, http://cag-www.lcs.mit.edu/raw, Proceedings of the Second SUIF Compiler Workshop, Aug. 21-23, 1997.

Albaharna, Osama, et al., "On the viability of FPGA-based integrated coprocessors", © 1996 IEEE, Publ. No. 0-8186-7548-9/96, pp. 206-215.

Amerson, Rick, et al., "Teramac—Configurable Custom Computing", © 1995 IEEE, Publ. No. 0-8186-7086-X/95, pp. 32-38.

Barthel, Dominique Aug. 25-26, 1997, "PVP a Parallel Video coProcessor", Hot Chips IX, pp. 203-210.

Bertin, Patrice, et al., "Programmable active memories: a performance assessment", © 1993 Massachusetts Institute of Technology, pp. 88-102.

Bittner, Ray, et al., "Computing kernels implemented with a wormhole RTR CCM", © 1997 IEEE, Publ. No. 0-8186-8159-4/97, pp. 98-105.

Buell, D., et al. "Splash 2: FPGAs in a Custom Computing Machine—Chapter 1—Custom Computing Machines: An Introduction", pp. 1-11, http://www.computer.org/espress/catalog/bp07413/spls-ch1.html (originally believed published in J. of Supercomputing, vol. IX, 1995, pp. 219-230.

Casselman, Steven, "Virtual Computing and The Virtual Computer", © 1993 IEEE, Publ. No. 0-8186-3890-7/93, pp. 43-48.

Chan, Pak, et al., "Architectural tradeoffs in field-programmable-device-based computing systems", © 1993 IEEE, Publ. No. 0-8186-3890-7/93, pp. 152-161.

Clark, David, et al., "Supporting FPGA microprocessors through retargetable software tools", © 1996 IEEE, Publ. No. 0-8186-7548-9/96, pp. 195-103.

Cuccaro, Steven, et al., "The CM-2X: a hybrid CM-2/Xilink prototype", © 1993 IEEE, Publ. No. 0-8186-3890-7/93, pp. 121-130.

Culbertson, W. Bruce, et al., "Exploring architectures for volume visualization on the Teramac custom computer", © 1996 IEEE, Pub. No. 0-8186-7548-9/96, pp. 80-88.

Culbertson, W. Bruce, et al., "Defect tolerance on the Teramac custom computer", © 1997 IEEE, Publ. No. 0-8186-8159-4/97, pp. 116-123.

Dehon, Andre, "DPGA-Coupled microprocessors: commodity IC for the early 21$^{st}$ century", © 1994 IEEE, Publ. No. 0-8186-5490-2/94, pp. 31-39.

Dehon, A., et al., "MATRIX A Reconfigurable Computing Device with Configurable Instruction Distribution", Hot Chips IX, Aug. 25-26, 1997, Stanford, California, MIT Artificial Intelligence Laboratory.

Dhaussy, Philippe, et al., "Global control synthesis for an MIMD/FPGA machine", © 1994 IEEE, Publ. No. 0-8186-5490-2/94, pp. 72-81.

Elliott, Duncan, et al., "Computational Ram: a memory-SIMD hybrid and its application to DSP", © 1992 IEEE, Publ. No. 0-7803-0246-X/92, pp. 30.6.1-30.6.4.

Fortes, Jose, et al., "Systolic arrays, a survey of seven projects", © 1987 IEEE, Publ. No. 0018-9162/87/0700-0091, pp. 91-103.

Gokhale, M., et al., "Processing in Memory: The Terasys Massively Parallel PIM Array" © Apr. 1995, IEEE, pp. 23-31.

Gunther, Bernard, et al., "Assessing Document Relevance with Run-Time Reconfigurable Machines", © 1996 IEEE, Publ. No. 0-8186-7548-9/96, pp. 10-17.

Hagiwara, Hiroshi, et al., "A dynamically microprogrammable computer with low-level parallelism", © 1980 IEEE, Publ. No. 0018-9340/80/07000-0577, pp. 577-594.

Hartenstein, R. W., et al. "A General Approach in System Design Integrating Reconfigurable Accelerators," http://xputers.informatik.uni-kl.de/papers/paper026-1.html, IEEE 1996 Conference, Austin, TX, Oct. 9-11, 1996.

Hartenstein, Reiner, et al., "A reconfigurable data-driven ALU for Xputers", © 1994 IEEE, Publ. No. 0-8186-5490-2/94, pp. 139-146.

Hauser, John, et al.: "GARP: a MIPS processor with a reconfigurable co-processor", © 1997 IEEE, Publ. No. 0-08186-8159-4/97, pp. 12-21.

Hayes, John, et al., "A microprocessor-based hypercube, supercomputer", © 1986 IEEE, Publ. No. 0272-1732/86/1000-0006, pp. 6-17.

Herpel, H.-J., et al., "A Reconfigurable Computer for Embedded Control Applications", © 1993 IEEE, Publ. No. 0-8186-3890-7/93, pp. 111-120.

Hogl, H., et al., "Enable++: A second generation FPGA processor", © 1995 IEEE, Publ. No. 0-8186-7086-X/95, pp. 45-53.

King, William, et al., "Using MORRPH in an industrial machine vision system", © 1996 IEEE, Publ. No. 08186-7548-9/96, pp. 18-26.

Manohar, Swaminathan, et al., "A pragmatic approach to systolic design", © 1988 IEEE, Publ. No. CH2603-9/88/0000/0463, pp. 463-472.

Mauduit, Nicolas, et al., "Lneuro 1.0: a piece of hardware LEGO for building neural network systems," © 1992 IEEE, Publ. No. 1045-9227/92, pp. 414-422.

Mirsky, Ethan A., "Coarse-Grain Reconfigurable Computing", Massachusetts Institute of Technology, Jun. 1996.

Mirsky, Ethan, et al., "MATRIX: A Reconfigurable Computing Architecture with Configurable Instruction Distribution and Deployable Resources", © 1996 IEEE, Publ. No. 0-8186-7548-9/96, pp. 157-166.

Morley, Robert E., Jr., et al., "A Massively Parallel Systolic Array Processor System", © 1988 IEEE, Publ. No. CH2603-9/88/0000/0217, pp. 217-225.

Patterson, David, et al., "A case for intelligent DRAM: IRAM", Hot Chips VIII, Aug. 19-20, 1996, pp. 75-94.

Peterson, Janes, et al., "Scheduling and partitioning ANSI-C programs onto multi-FPGA CCM architectures", © 1996 IEEE, Publ. No. 0-8186-7548-9/96, pp. 178-187.

Schmit, Herman, "Incremental reconfiguration for pipelined applications," © 1997 IEEE, Publ. No. 0-8186-8159-4/97, pp. 47-55.

Sitkoff, Nathan, et al., "Implementing a Genetic Algorithm on a Parallel Custom Computing Machine", Publ. No. 0-8186-7086-X/95, pp. 180-187.

Stone, Harold, "A logic-in-memory computer", © 1970 IEEE, IEEE Transactions on Computers, pp. 73-78, Jan. 1990.

Tangen, Uwe, et al., "A parallel hardware evolvable computer POLYP extended abstract", © 1997 IEEE, Publ. No. 0-8186-8159/4/97, pp. 238-239.

Thornburg, Mike, et al., "Transformable Computers", © 1994 IEEE, Publ. No. 0-8186-5602-6/94, pp. 674-679.

Tomita, Shinji, et al., "A computer low-level parallelism QA-2", © 1986 IEEE, Publ. No. 0-0384-7495/86/0000/0280, pp. 280-289.

Trimberger, Steve, et al., "A time-multiplexed FPGA", © 1997 IEEE, Publ. No. 0-8186-8159-4/97, pp. 22-28.

Ueda, Hirotada, et al., "A multiprocessor system utilizing enhanced DSP's for image processing", © 1988 IEEE, Publ. No. CH2603-9/88/0000/0611, pp. 611-620.

Villasenor, John, et al., "Configurable computing", © 1997 Scientific American, Jun. 1997.

Wang, Quiang, et al., "Automated field-programmable compute accelerator design using partial evaluation", © 1997 IEEE, Publ. No. 0-8186-8159-4/97. pp. 145-154.

W.H. Manglone-Smith and B.L. Hutchings. Configurable computing: The Road Ahead. In Proceedings of the Reconfigurable Architectures Workshop (RAW'97), pp. 81-96, 1997.

Wirthlin, Michael, et al., "The Nano processor: a low resource reconfigurable processor", © 1994 IEEE, Publ. No. 0-8186-5490-2/94, pp. 23-30.

Wirthlin, Michael, et al., "A dynamic instruction set computer", © 1995 IEEE, Publ. No. 0-8186-7086-X/95, pp. 99-107.

Wittig, Ralph, et al., "One Chip: An FPGA processor with reconfigurable logic", © 1996 IEEE, Publ. 0-8186-7548-9/96, pp. 126-135.

Yamauchi, Tsukasa, et al., "SOP: A reconfigurable massively parallel system and its control-data flow based compiling method", © 1996 IEEE, Publ. No. 0-8186-7548-9/96, pp. 148-156.

"Information Brief", PCI Bus Technology, © IBM Personal Computer Company, 1997, pp. 1-3.

Yun, Hyun-Kyu and Silverman, H. F.; "A distributed memory MIMD multi-computer with reconfigurable custom computing capabilities", Brown University, Dec. 10-13, 1997, pp. 7-13.

Hoover, Chris and Hart, David; "San Diego Supercomputer Center, Timelogic and Sun Validate Ultra-Fast Hidden Markov Model Analysis-One DeCypher-accelerated Sun Fire 6800 beats 2,600 CPUs running Linux-", San Diego Supercomputer Center, http://www.sdsc.edu/Press/02/050802_markovmodel.html, May 8, 2002, pp. 1-3.

Caliga, David and Barker, David Peter, "Delivering Acceleration: The Potential for Increased HPC Application Performance Using Reconfigurable Logic", SRC Computers, Inc., Nov. 2001, pp. 20.

Hammes, J.P., Rinker, R. E.; McClure, D, M., Böhm, A. P. W., Najjar, W. A., "The SA-C Compiler Dataflow Description", Colorado State University, Jun. 21, 2001, pp. 1-25.

Callahan, Timothy J. and Wawrzynek, John, "Adapting Software Pipelining for Reconfigurable Computing", University of California at Berkeley, Nov. 17-19, 2000, pp. 8.

Ratha, Nalini K., Jain, Anil K. and Rover, Diane T., "An FPGA-based Point Pattern Matching Processor with Application to Fingerprint Matching", Michigan State University, Department of Computer Science, pp. 8.

Dehon, André, "Comparing Computing Machines", University of California at Berkeley, Proceedings of SPIE vol. 3526, Nov. 2-3, 1998, pp. 11.

Vemuri, Ranga R. and Harr, Randolph E., "Configurable Computing: Technology and Applications", University of Cincinnati and Synopsys Inc., IEEE, Apr. 2000, pp. 39-40.

Dehon, André, "The Density Advantage of Configurable Computing", California Institute of Technology, IEEE, Apr. 2000. pp. 41-49.

Haynes, Simon D., Stone, John, Cheung, Peter Y.K. and Luk, Wayne, "Video Image Processing with the Sonic Architecture", Sony Broadcast & Professional Europe, Imperial College, University of London, IEEE, Apr. 2000, pp. 50-57.

Platzner, Marco, "Reconfigurable Accelerators for Combinatorial Problems", Swiss Federal Institute of Technology (ETH) Zurich, IEEE, Apr. 2000, pp. 58-60.

Callahan, Timothy J., Hauser, John R. And Wawrzynek, John, "The Garp Architecture and C Compiler", University of California, Berkeley, IEEE, April 2000, pp. 62-69.

Goldstein, Seth Copen, Schmit, Herman, Budiu, Mihai, Cadambi, Srihari, Moe, Matt and Taylor, R. Reed, "PipeRench: A Reconfigurable Architecture and Compiler", Carnegie Mellon University, IEEE, Apr. 2000, pp. 70-76.

Muchnick, Steven S., "Advanced Compiler Design and Implementation", Morgan Kaufmann Publishers, pp. 217.

Hammes, Jeffrey P., Dissertation "Compiling SA-C To Reconfigurable Computing Systems", Colorado State University, Department of Computer Science, Summer 2000, pp. 179.

Automatic Target Recognition, Colorado State University & USAF, http://www.cs.colostate.edu/cameron/applications.html, pp. 1-3.

Chodowiec, Pawel, Khuon, Po, Gaj, Kris, Fast Implementations of Secret-Key Block Ciphers Using Mixed Inner- and Outer-Round Pipelining, George Mason University, Feb. 11-13, 2001, pp. 9.

Miyamori, Takashi, "REMARC: Reconfigurable Multimedia Array Coprocessor", IEICE Transactions on Information and Systems, Information & Systems Society, Tokyo, JP, vol. E82-D, No. 2, Feb. 1999, pp. 389-397, XP000821922.

Gross Thomas, et al., "Compilation for a High-performance Systolic Array", Sigplan Notices USA, vol. 21, No. 7, Jul. 1986, pp. 27-38, XP002418625.

Rauchwerger, Lawrence, et al., "The LRPD Test: Speculative Run-Time Parallelization of Loops with Privatization and Reduction Parallelization", IEEE Transaction on Parallel and Distributed Systems, IEEE Service Center, Los Alamitos, CA, vol. 10, No. 2, Feb. 1999, pp. 160-180, XP000908318.

Arnold Jeffrey M. et al., "The Splash 2 Processor and Applications", Computer Design: VLSI in Computers and Processors, 1993, ICCD '93 Proceedings, 1993 IEEE International Conference on Cambridge, MA, Oct. 3-6 1993, Los Alamitos, CA, IEEE Comput. Soc., Oct. 3, 1993, pp. 482-485, XP010134571.

Hwang, Kai, "Computer Architecture and Parallel Processing", Data Flow Computers and VLSI Computations, 1985, McGraw Hill, Chapter 10, pp. 732-807, XP-002418655.

Hartenstein, Reiner W., et al. "A Synthesis System for Bus-based Wavefront Array Architectures", Proceedings, International Conference on Application-Specific Systems, Architecture and Processors, 1996, pp. 274-283, XP002132819.

Alexander, Thomas, et al. "A Reconfigurable Approach To A Systolic Sorting Architecture", ISCAS 89, May 8, 1989, pp. 1178-1182, XP010084477.

Wu, Youfeng, et al. "Better Exploration of Region-Level Value Locality with Integrated Computation Reuse and Value Prediction", Proceedings of the 28th International Symposium on Computer Architecture, ISCA 2001, Goteberg, Sweden, Jun. 30-Jul. 4, 2001, International Symposium on Computer Architecture, (ISCA), Los Alamitos, CA, IEEE Comp. Soc, US, Jun. 30, 2001, pp. 93-103, XP010552866.

* cited by examiner

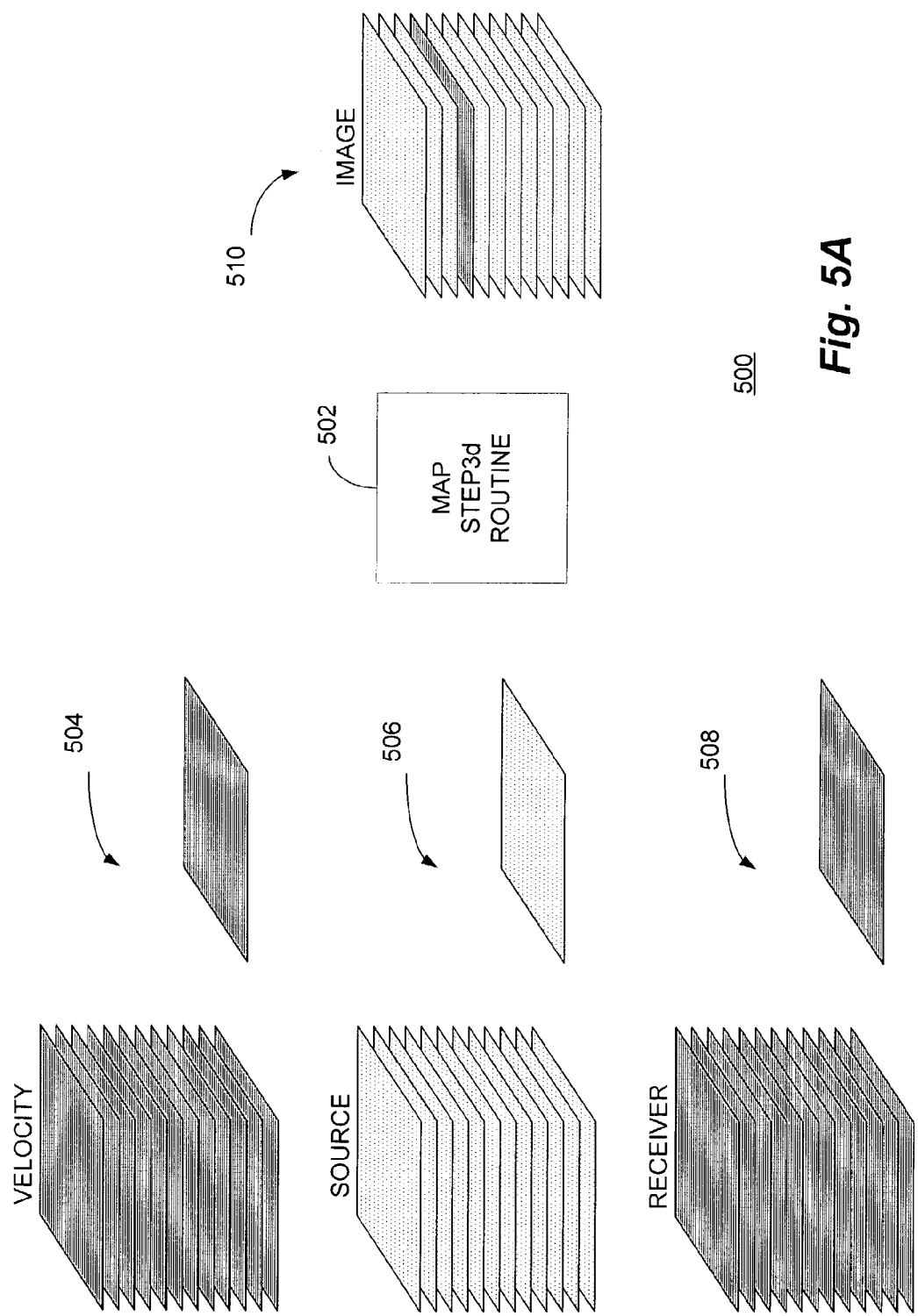

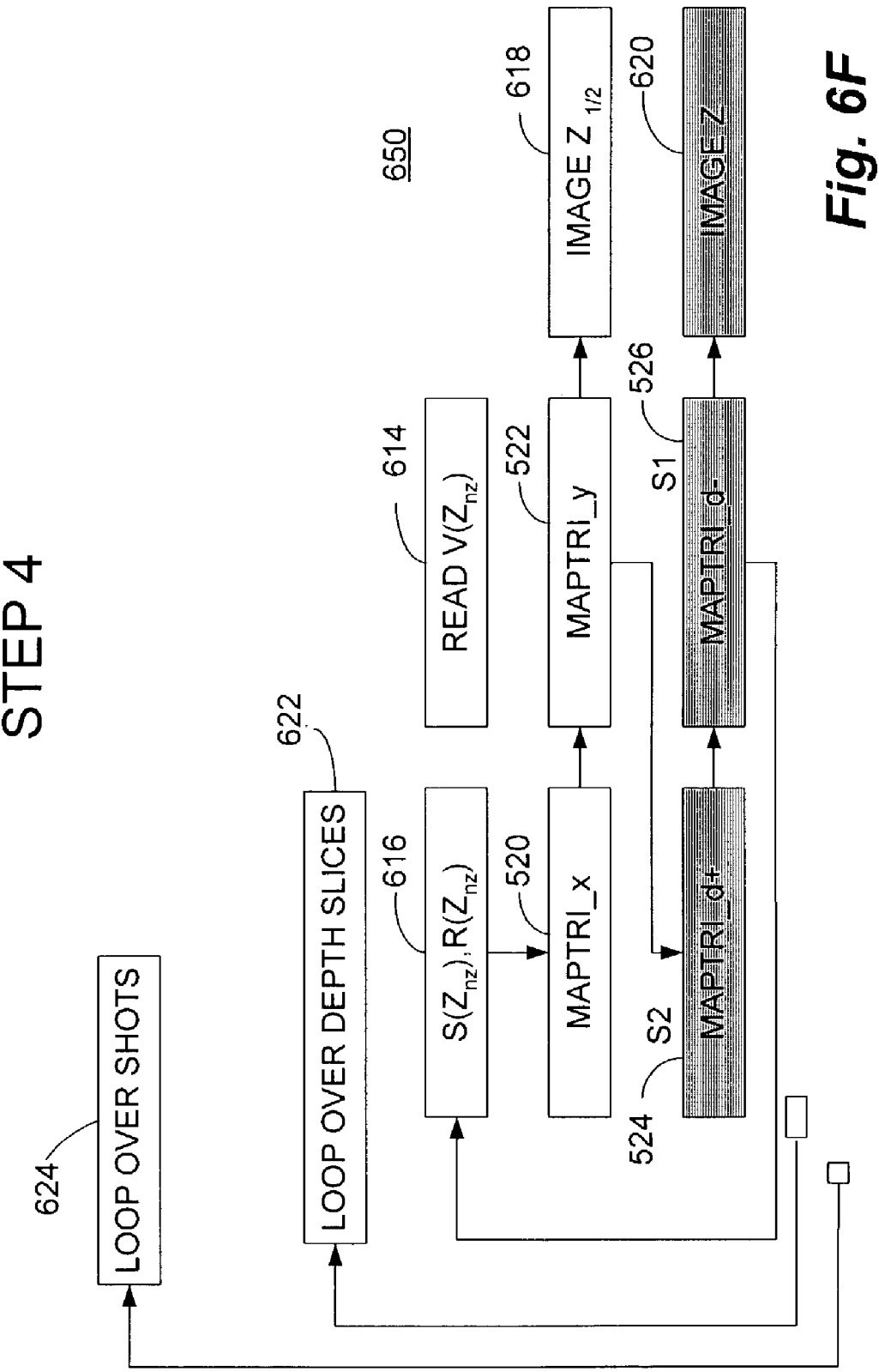

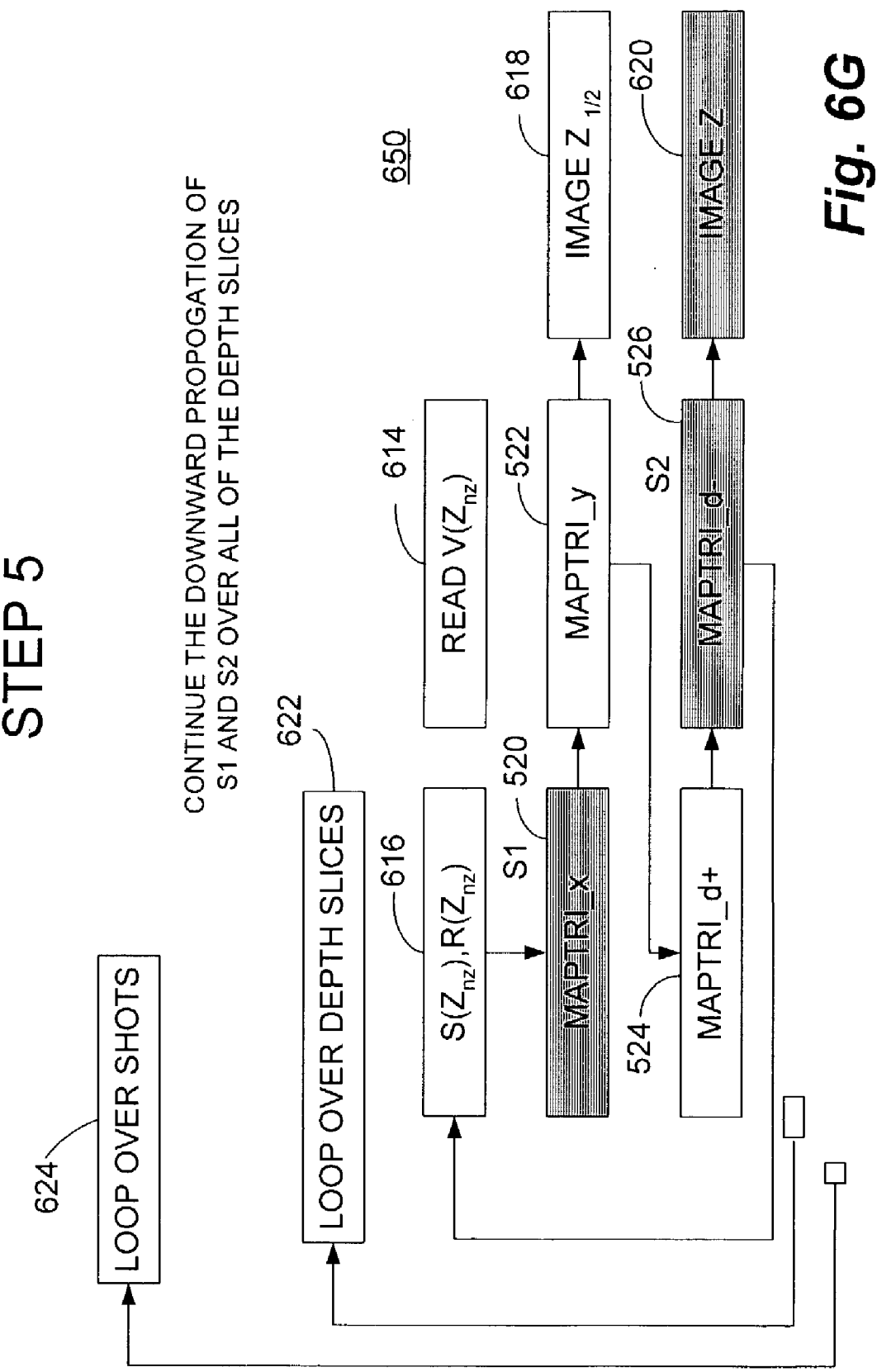

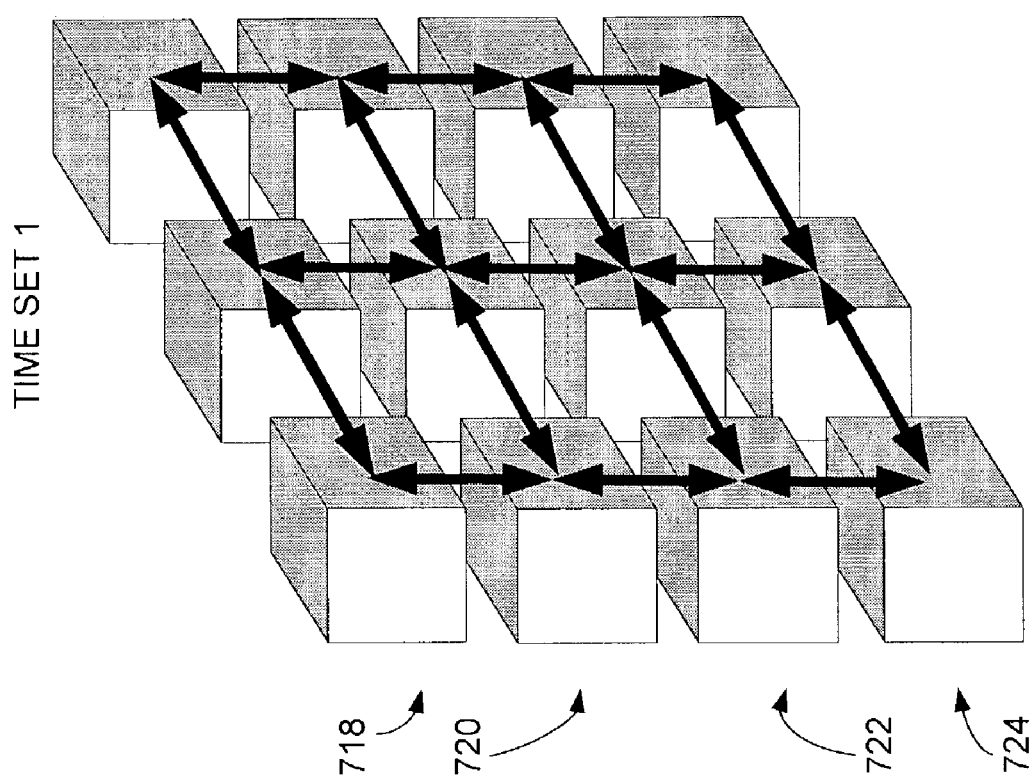

MULTI-ADAPTIVE PROCESSING SYSTEMS AND TECHNIQUES FOR ENHANCING PARALLELISM AND PERFORMANCE OF COMPUTATIONAL FUNCTIONS

CROSS REFERENCE TO RELATED PATENT APPLICATIONS

The present invention is related to the subject matter of U.S. patent application Ser. No. 09/755,744 filed Jan. 5, 2001 for: "Multiprocessor Computer Architecture Incorporating a Plurality of Memory Algorithm Processors in the Memory Subsystem" and is further related to the subject matter of U.S. Pat. No. 6,434,687 for: "System and Method for Accelerating Web Site Access and Processing Utilizing a Computer System Incorporating Reconfigurable Processors Operating Under a Single Operating System Image", all of which are assigned to SRC Computers, Inc., Colorado Springs, Colo. and the disclosures of which are herein specifically incorporated in their entirety by this reference.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the United States Patent and Trademark Office patent file or records, but otherwise, reserves all copyright rights whatsoever. The following notice applies to the software and data and described below, inclusive of the drawing figures where applicable: Copyright© 2000, SRC Computers, Inc.

BACKGROUND OF THE INVENTION

The present invention relates, in general, to the field of computing systems and techniques. More particularly, the present invention relates to multi-adaptive processing systems and techniques for enhancing parallelism and performance of computational functions.

Currently, most large software applications achieve high performance operation through the use of parallel processing. This technique allows multiple processors to work simultaneously on the same problem to achieve a solution in a fraction of the time required for a single processor to accomplish the same result. The processors in use may be performing many copies of the same operation, or may be performing totally different operations, but in either case all processors are working simultaneously.

The use of such parallel processing has led to the proliferation of both multi-processor boards and large scale clustered systems. However, as more and more performance is required, so is more parallelism, resulting in ever larger systems. Clusters exist today that have tens of thousands of processors and can occupy football fields of space. Systems of such a large physical size present many obvious downsides, including, among other factors, facility requirements, power, heat generation and reliability.

SUMMARY OF THE INVENTION

However, if a processor technology could be employed that offers orders of magnitude more parallelism per processor, these systems could be reduced in size by a comparable factor. Such a processor or processing element is possible through the use of a reconfigurable processor. Reconfigurable processors instantiate only the functional units needed to solve a particular application, and as a result, have available space to instantiate as many functional units as may be required to solve the problem up to the total capacity of the integrated circuit chips they employ.

At present, reconfigurable processors, such as multi-adaptive processor elements (MAP™, a trademark of SRC Computers, Inc.) can achieve two to three orders of magnitude more parallelism and performance than state-of-the-art microprocessors. Through the advantageous application of adaptive processing techniques as disclosed herein, this type of reconfigurable processing parallelism may be employed in a variety of applications resulting in significantly higher performance than that which can now be achieved while using significantly smaller and less expensive computer systems.

However, in addition to these benefits, there is an additional much less obvious one that can have even greater impact on certain applications and has only become available with the advent of multi-million gate reconfigurable chips. Performance gains are also realized by reconfigurable processors due to the much tighter coupling of the parallel functional units within each chip than can be accomplished in a microprocessor based computing system.

In a multi-processor, microprocessor-based system, each processor is allocated but a relatively small portion of the total problem called a cell. However, to solve the total problem, results of one processor are often required by many adjacent cells because their cells interact at the boundary and upwards of six or more cells, all having to interact to compute results, would not be uncommon. Consequently, intermediate results must be passed around the system in order to complete the computation of the total problem. This, of necessity, involves numerous other chips and busses that run at much slower speeds than the microprocessor thus resulting in system performance often many orders of magnitude lower than the raw computation time.

On the other hand, in the use of an adaptive processor-based system, since ten to one thousand times more computations can be performed within a single chip, any boundary data that is shared between these functional units need never leave a single integrated circuit chip. Therefore, data moving around the system, and its impact on reducing overall system performance, can also be reduced by two or three orders of magnitude. This will allow both significant improvements in performance in certain applications as well as enabling certain applications to be performed in a practical timeframe that could not previously be accomplished.

Particularly disclosed herein is a method for data processing in a reconfigurable computing system comprising a plurality of functional units. The method comprises: defining a calculation for the reconfigurable computing system; instantiating at least two of the functional units to perform the calculation; utilizing a first of the functional units to operate upon a subsequent data dimension of the calculation and substantially concurrently utilizing a second of the functional units to operate upon a previous data dimension of the calculation.

Further disclosed herein is a method for data processing in a reconfigurable computing system comprising a plurality of functional units. The method comprises: defining a first systolic wall comprising rows of cells forming a subset of the plurality of functional units; computing a value at each of the cells in at least a first row of the first systolic wall; communicating the values between cells in the first row of the cells to produce updated values; communicating the updated values to a second row of the first systolic wall; and substantially concurrently providing the updated values to a first row of a second systolic wall of rows of cells in the subset of the plurality of functional units.

Also disclosed herein is a method for data processing in a reconfigurable processing system which includes setting up a systolic processing form employing a speculative processing strategy.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 5A is illustrative of a general process for performing a representative multi-dimensional pipeline operation in the form of a seismic migration imaging function utilizing the parallelism available in the utilization of the adaptive processing techniques of the present invention;

FIG. 6F illustrates the fourth step in the same computational process showing the subsequent operation on shots S1 and S2;

FIG. 6G illustrates the fifth step in the same computational process followed by the continued downward propagation of shots S1 and S2 over all of the depth slices;

FIG. 7C illustrates the creation of a systolic wall of computation at Time Set 1 which has been started for a vertical wall of cells and in which communication of values between adjacent rows in the vertical wall can occur without storing values to memory;

DESCRIPTION OF A REPRESENTATIVE EMBODIMENT

This application incorporates by reference the entire disclosure of Caliga, D. et al. "Delivering Acceleration: "The Potential for Increased HPC Application Performance Using Reconfigurable Logic", SC2001, November 2001, ACM 1-58113-293-X/01/0011.

Figure 1:
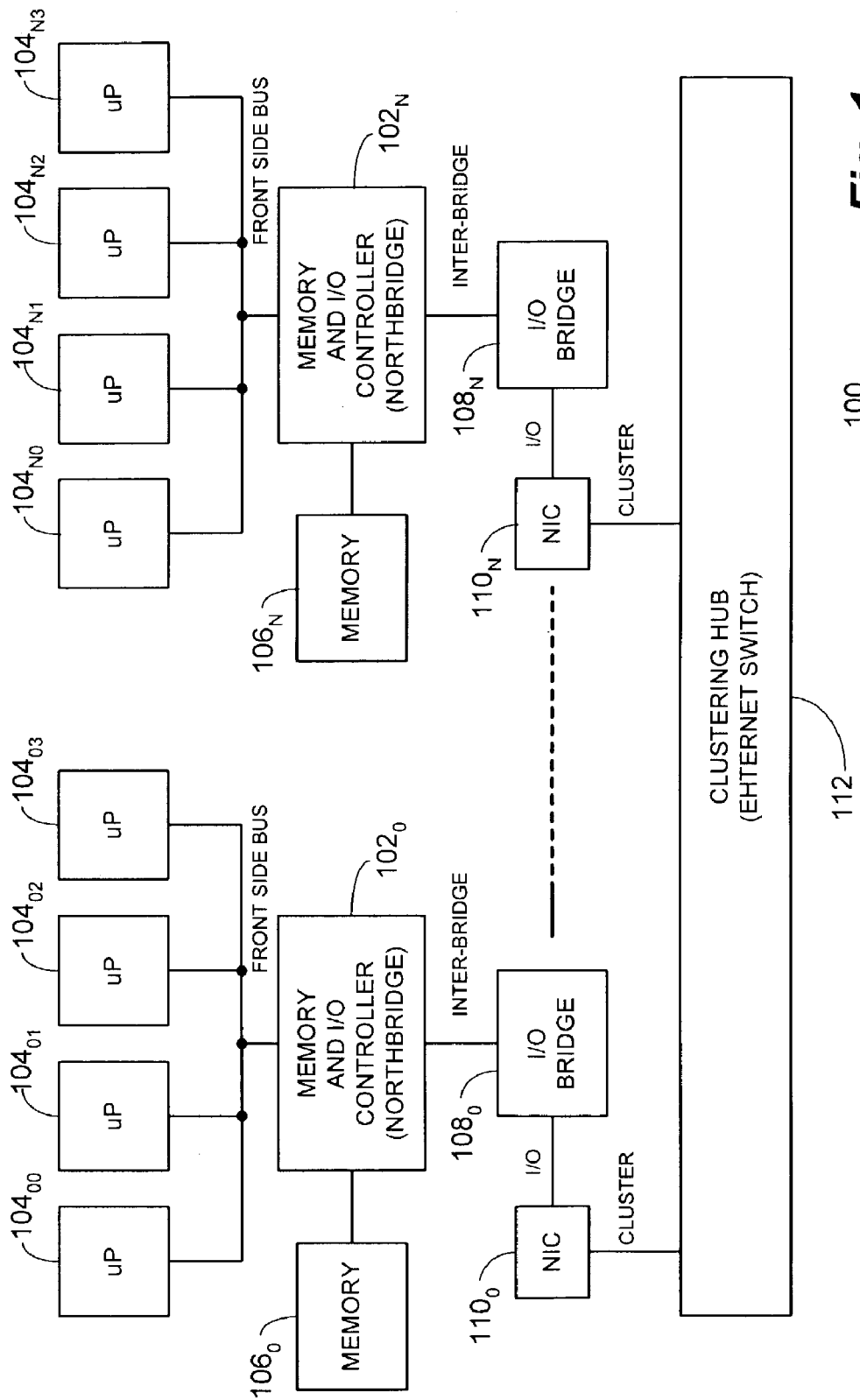
FIG. 1 is a simplified functional block diagram of typical clustered inter-processor communications path in a conventional multi-processor computing system.

With reference now to FIG. 1, a simplified functional block diagram of typical clustered inter-processor communications path in a conventional multi-processor computing system 100 is shown. The computer system comprises a number of memory and input/output ("I/O") controller integrated circuits ("ICs") $102_0$ through $102_N$, (e.g. "North Bridge") 102 such as the P4X333/P4X400 devices available from VIA Technologies, Inc.; the M1647 device available from Acer Labs, Inc. and the 824430X device available from Intel Corporation. The North Bridge IC 102 is coupled by means of a Front Side Bus ("FSB") to one or more microprocessors $104_{00}$ though $104_{03}$ and $104_{N0}$ through $104_{N3}$ such as one of the Pentium® series of processors also available from Intel Corporation.

The North Bridge ICs $102_0$ through $102_N$ are coupled to respective blocks of memory $106_0$ through $106_N$ as well as to a corresponding I/O bridge element $108_0$ through $108_N$. A network interface card ("NIC") $110_0$ through $210_N$ couples the I/O bus of the respective I/O bridge $108_0$ through $108_N$ to a cluster bus coupled to a common clustering hub (or Ethernet Switch) 112.

Since typically a maximum of four microprocessors 104, each with two or four functional units, can reside on a single Front Side Bus, any communication to more than four must pass over the Front Side Bus, inter-bridge bus, input/output ("I/O") bus, cluster interconnect (e.g. an Ethernet clustering hub 112) and then back again to the receiving processor 104. The I/O bus is typically an order of magnitude lower in bandwidth than the Front Side Bus, which means that any processing involving more than the four processors 104 will be significantly throttled by the loose coupling caused by the interconnect. All of this is eliminated with a reconfigurable processor having hundreds or thousands of functional units per processor.

Figure 2:
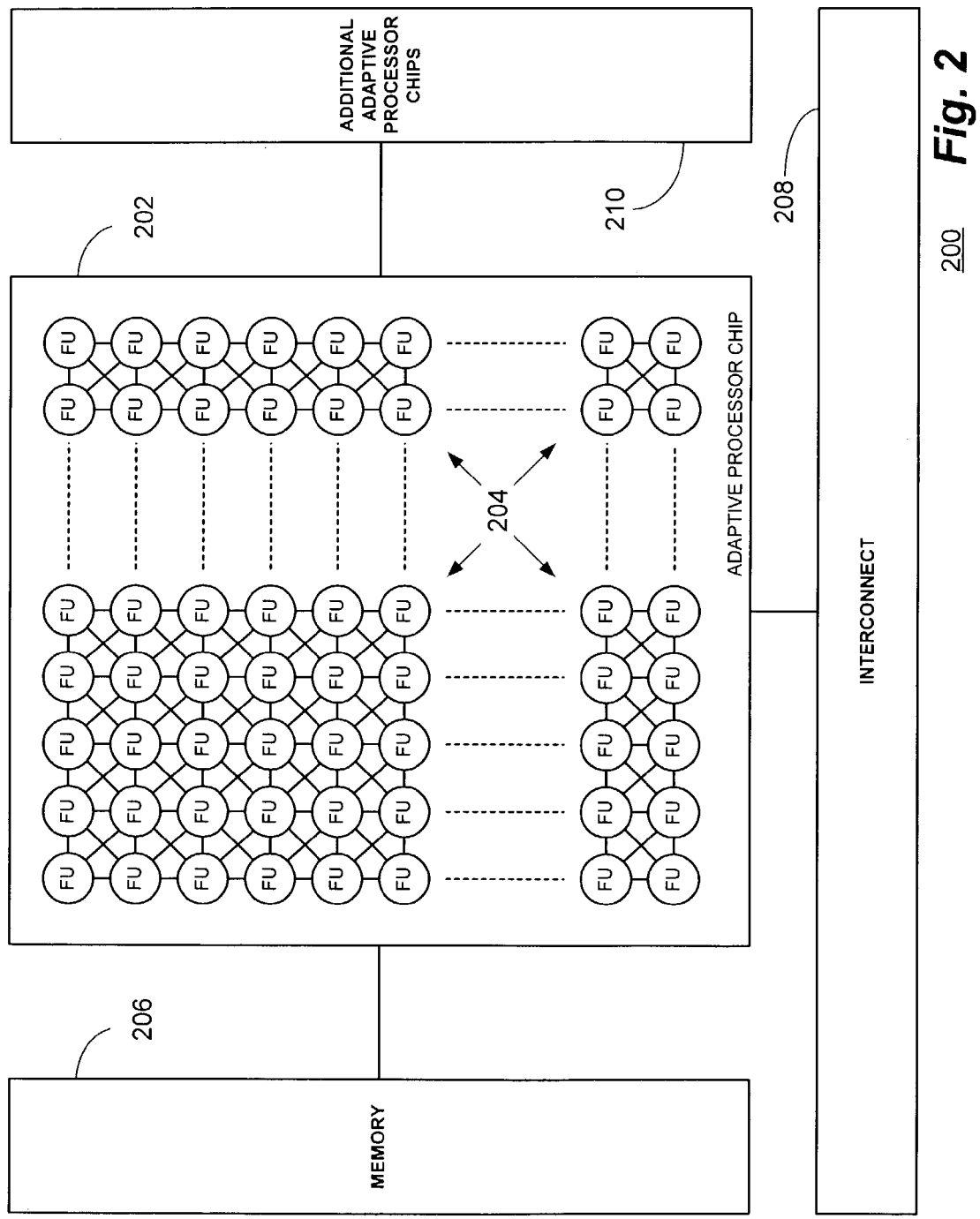
FIG. 2 is a functional block diagram of an adaptive processor communications path illustrating the many functional units ("FU") interconnected by reconfigurable routing resources within the adaptive processor chip.

With reference additionally now to FIG. 2, a functional block diagram of an adaptive processor 200 communications path for implementing the technique of the present invention is shown. The adaptive processor 200 includes an adaptive processor chip 202 incorporates a large number of functional units ("FU") 204 interconnected by reconfigurable routing resources. The adaptive processor chip 202 is coupled to a memory element 206 as well as an interconnect 208 and a number of additional adaptive processor chips 210.

As shown, each adaptive processor chip 202 can contain thousands of functional units 204 dedicated to the particular problem at hand. Interconnect between these functional units is created by reconfigurable routing resources inside each chip 202. As a result, the functional units 204 can share or exchange data at much higher data rates and lower latencies than a standard microprocessor 104 (FIG. 1). In addition, the adaptive processor chips 202 can connect directly to the inter-processor interconnect 208 and do not require the data to be passed through multiple chips in a chipset in order to communicate. This is because the adaptive processor can implement whatever kind of interface is needed to accomplish this connection.

Figure 3B:
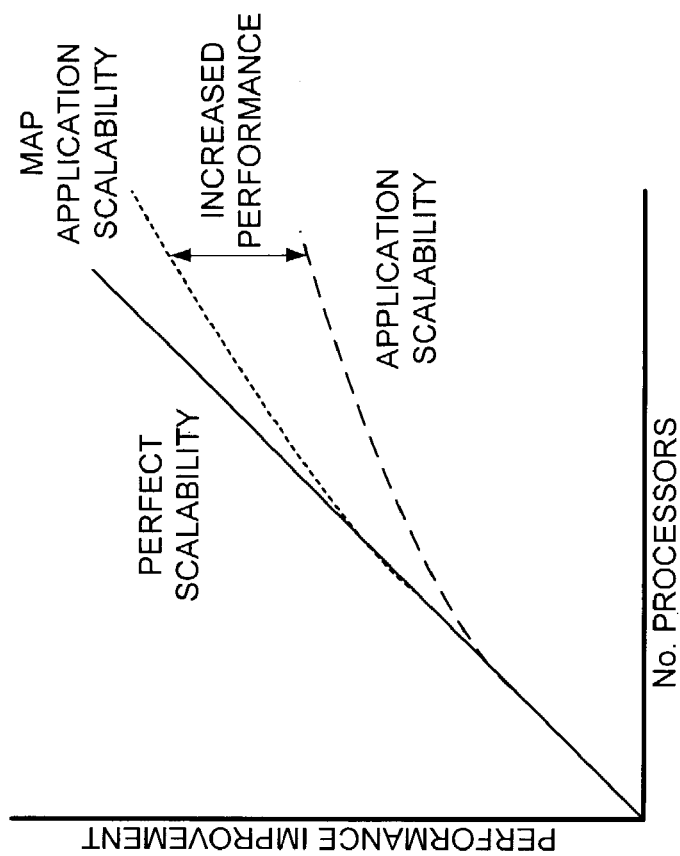
FIG. 3B is a corresponding graph of the actual performance improvement versus the number of processors utilized and illustrating the performance improvement over a conventional multi-processor computing system utilizing an adaptive processor-based computing system such as that illustrated in FIG. 2.
Figure 3A:
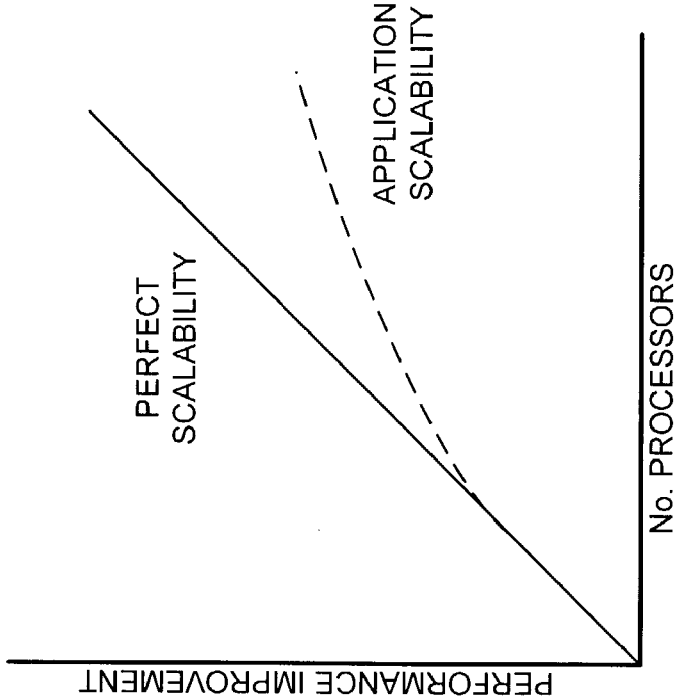
FIG. 3A is a graph of the actual performance improvement versus the number of processors utilized and illustrating the deviation from perfect scalability of a particular application utilizing a conventional multi-processor computing system such as that illustrated in FIG. 1.

With reference additionally now to FIG. 3A, a graph of the actual performance improvement versus the number of processors utilized in a conventional multi-processor computing system 100 (FIG. 1) is shown. In this figure, the deviation from perfect scalability of a particular application is illustrated for such a system.

With reference additionally now to FIG. 3B, a corresponding graph of the actual performance improvement versus the number of processors utilized in an adaptive processor-based computing system 200 (FIG. 2) is shown. In this figure, the performance improvement provided with an adaptive processor-based computing system 200 over that of a conventional multi-processor computing system 100 is illustrated.

Figure 4B:
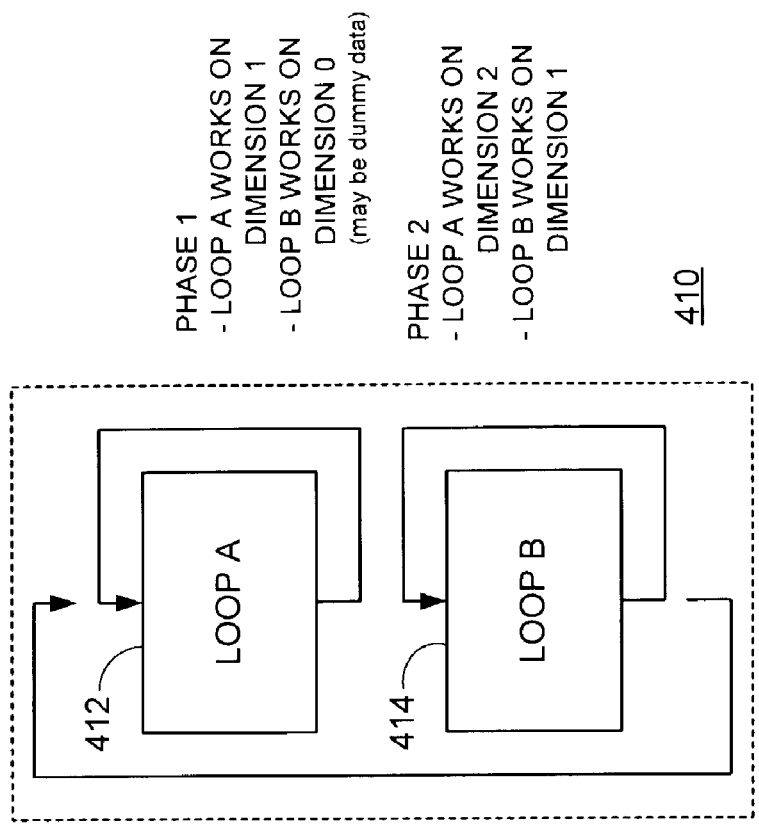
FIG. 4B is a comparative, simplified logic flowchart illustrating multi-dimensional processing in accordance with the technique of the present invention wherein multiple dimensions of data are processed by both Loops A and B such that the computing system logic is operative on every clock cycle.
Figure 4A:
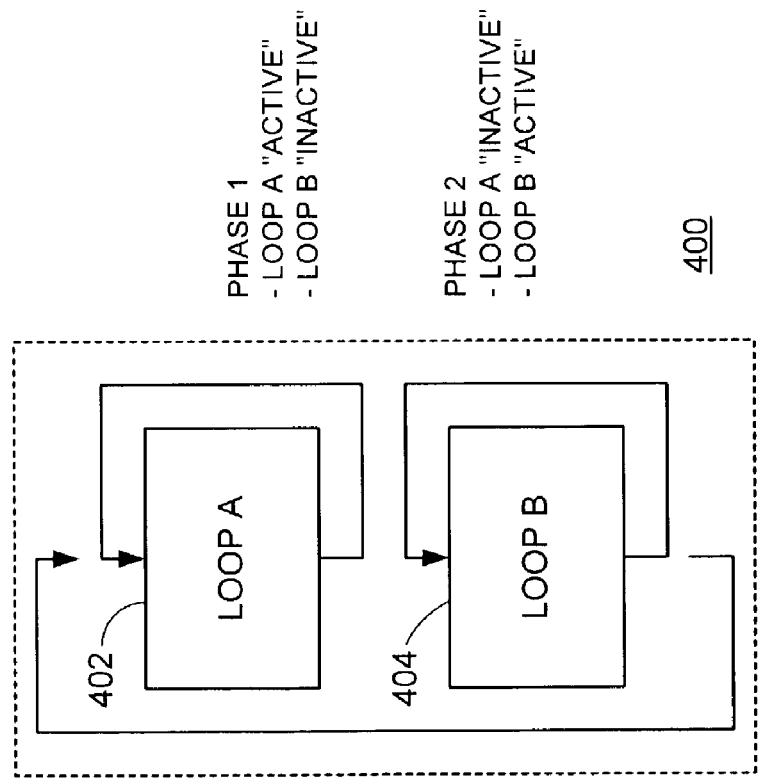
FIG. 4A is a simplified logic flowchart illustrating a conventional sequential processing operation in which nested Loops A and B are alternately active on different phases of the process.

With reference additionally now to FIG. 4A, a simplified logic flowchart is provided illustrating a conventional sequential processing operation 400 in which nested Loops A (first loop 402) and B (second loop 404) are alternately active on different phases of the process.

As shown, the standard implementation of applications that have a set of nested loops 402,404 is to complete the processing of the first loop 402 before proceeding to the second loop 404. The problem inherent in this approach, particularly when utilized in conjunction with field programmable gate arrays ("FPGAs") is that all of the logic that has been instantiated is not being completely utilized.

With reference additionally now to FIG. 4B, a comparative, simplified logic flowchart is shown illustrating a multi-dimensional process 410 in accordance with the technique of the present invention. The multi-dimensional process 410 is effectuated such that multiple dimensions of data are processed by both Loops A (first loop 412) and B (second loop 414) such that the computing system logic is operative on every clock cycle.

In contrast to the sequential processing operation 400 (FIG. 4A) the solution to the problem of most effectively utilizing available resources is to have an application evaluate a problem in a data flow sense. That is, it will "pass" a subsequent dimension of a given problem through the first loop 412 of logic concurrently with the previous dimension of data being processed through the second loop 414. In practice, a "dimension" of data can be: multiple vectors of a problem, multiple planes of a problem, multiple time steps in a problem and so forth.

With reference additionally now to FIG. 5A, a general process for performing a representative multi-dimensional pipeline operation is shown in the form of a seismic migration imaging function 500. The process 500 can be adapted to utilize the parallelism available in the utilization of the adaptive processing techniques of the present invention in the form of a multi-adaptive processor (MAP™, a trademark of SRC Computers, Inc., assignee of the present invention) STEP3d routine 502. The MAP STEP3d routine 502 is operation to utilize velocity data 504, source data 506 and receiver data 508 to produce a resultant image 510 as will be more fully described hereinafter.

Figure 5B:
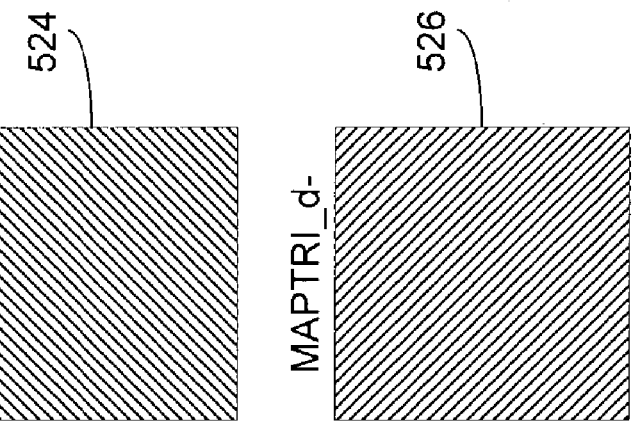
FIG. 5B is a follow-on illustration of the computation phases employed in implementing the exemplary seismic migration imaging function of the preceding figure.
Figure 5B:
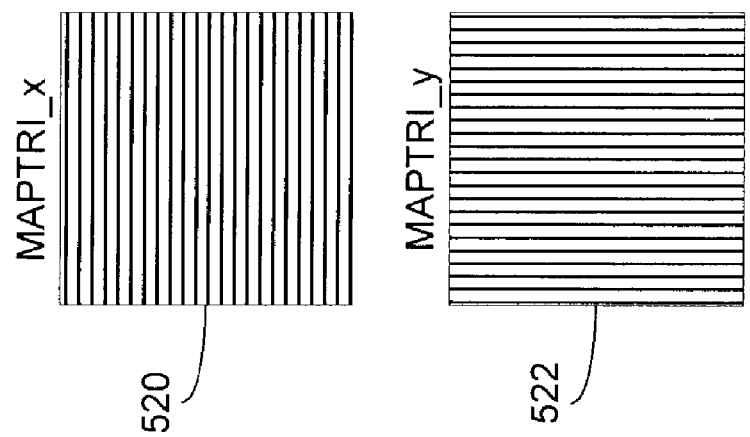
Figure 5B:
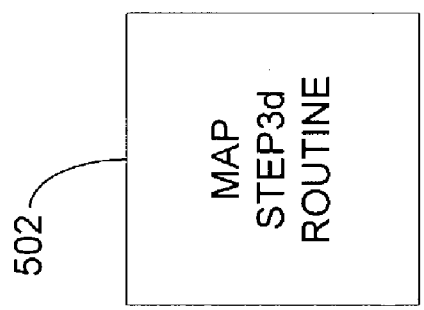

With reference additionally now to FIG. 5B, the MAP STEP3d routine 502 of the preceding figure is shown in the various computational phases of: MAPTRI_x 520, MAPTRI_y 522, MAPTRI_d+ 524 and MAPTRI_d− 526.

Figures 6A, 6B:
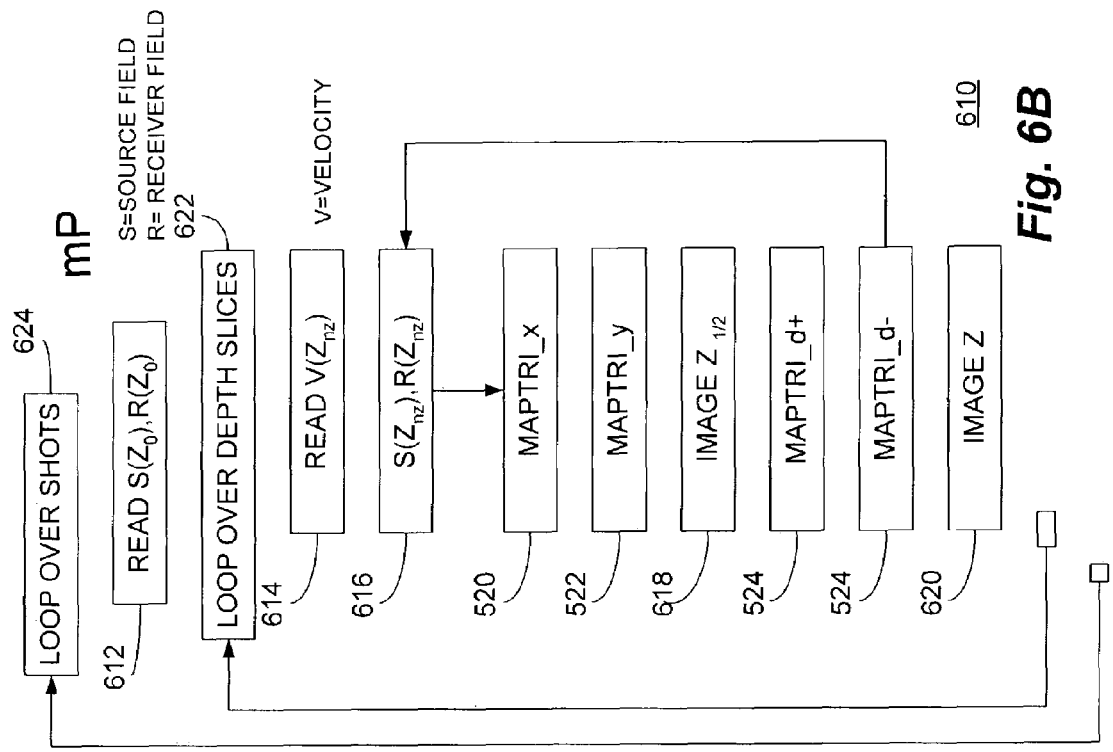
FIG. 6A is a simplified logic flowchart for a particular seismic migration imaging application illustrative of the parallelism provided in the use of an adaptive processor-based computing system.
FIG. 6B illustrates the computational process which may be employed by a microprocessor in the execution of the seismic imaging application of the preceding figure.

With reference additionally now to FIG. 6A, a simplified logic flowchart for a particular seismic migration imaging application 600 is shown. The seismic migration imaging application 600 is illustrative of the parallelism provided in the use of an adaptive processor-based computing system 200 such as that shown in FIG. 2. The representative application 600 demonstrates a nested loop parallelism in the tri-diagonal solver and the same logic can be implemented for the multiple tri-diagonal solvers in the x, y, d+ and d− directions. The computational phases of: MAPTRI_x 520, MAPTRI_y 522, MAPTRI_d+ 524 and MAPTRI_d− 526 are again illustrated.

With reference additionally now to FIG. 6B, a computational process 610 is shown which may be employed by a microprocessor ("mP") in the execution of the seismic imaging application 600 of the preceding figure. The process 610 includes the step 612 of reading the source field $[S(Z_0)]$ and receiver field $[R(Z_0)]$ as well as the velocity field $[V(Z_0)]$ at step 614. At step 616 values are computed for $S(Z_{nz})$, $R(Z_{nz})$ which step is followed by the phases MAPTRI_x 520 and MAPTRI_y 522. At step 618, the image of $Z_{1/2}$ is computed. This is followed by the phases MAPTRI_d+ 524 and MAPTRI_d− 526 to produce the resultant image Z at step 620. The process 610 loops over the depth slices as indicated by reference number 622 and loops over the shots as indicated by reference number 624.

Figure 6C:
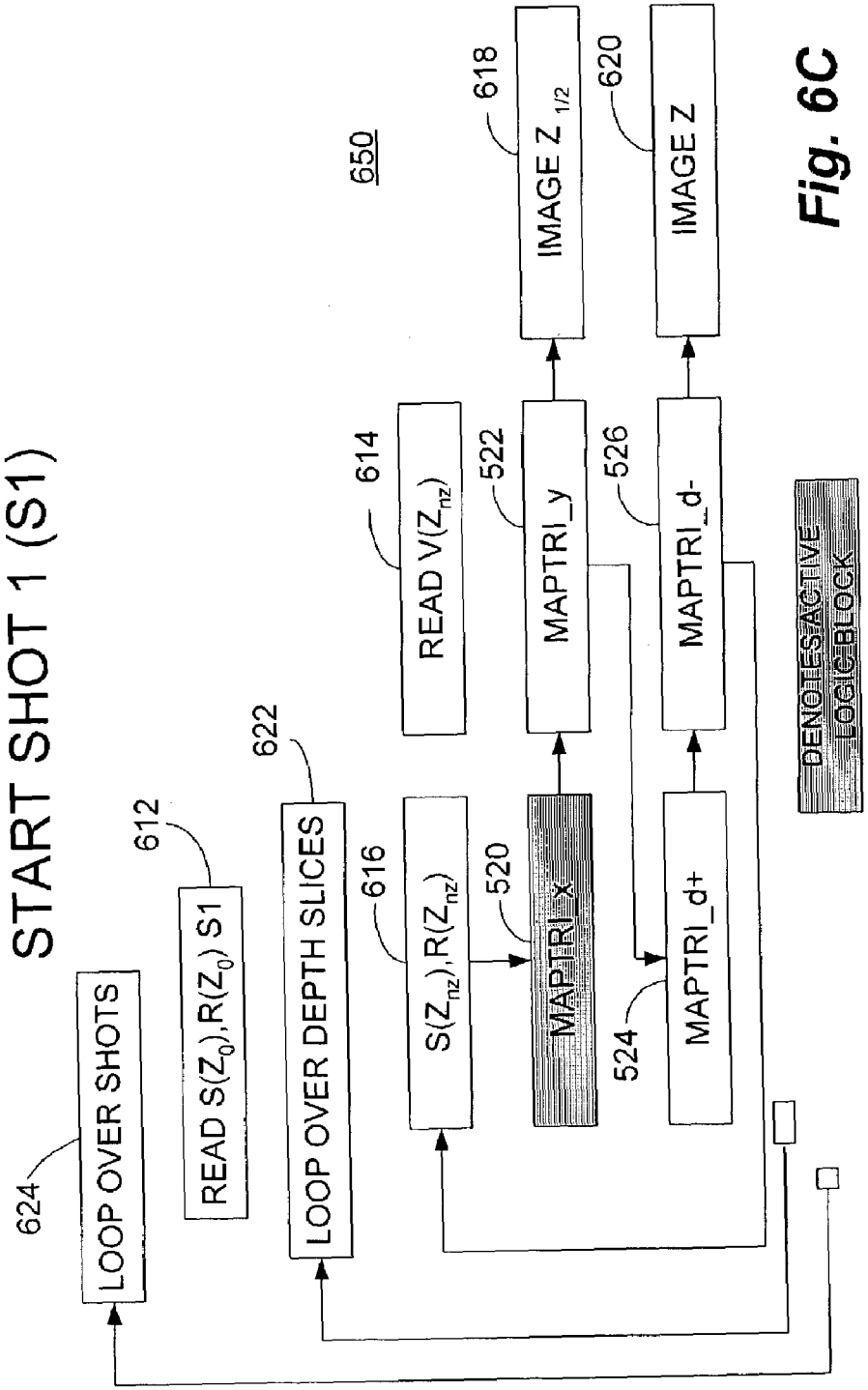
FIG. 6C illustrates the first step in the computational process which may be employed by an adaptive processor in the execution of the seismic imaging application of FIG. 6A in which a first shot (S1) is started.

With reference additionally now to FIG. 6C, the first step in a computational process 650 in accordance with the technique of the present invention is shown in which a first shot (S1) is started. The process 650 may be employed by an adaptive processor (e.g. a MAP™ adaptive processor) as disclosed herein in the execution of the seismic imaging application 600 of FIG. 6A. As indicated by the shaded block, the phase MAPTRI_x 520 is active.

Figure 6D:
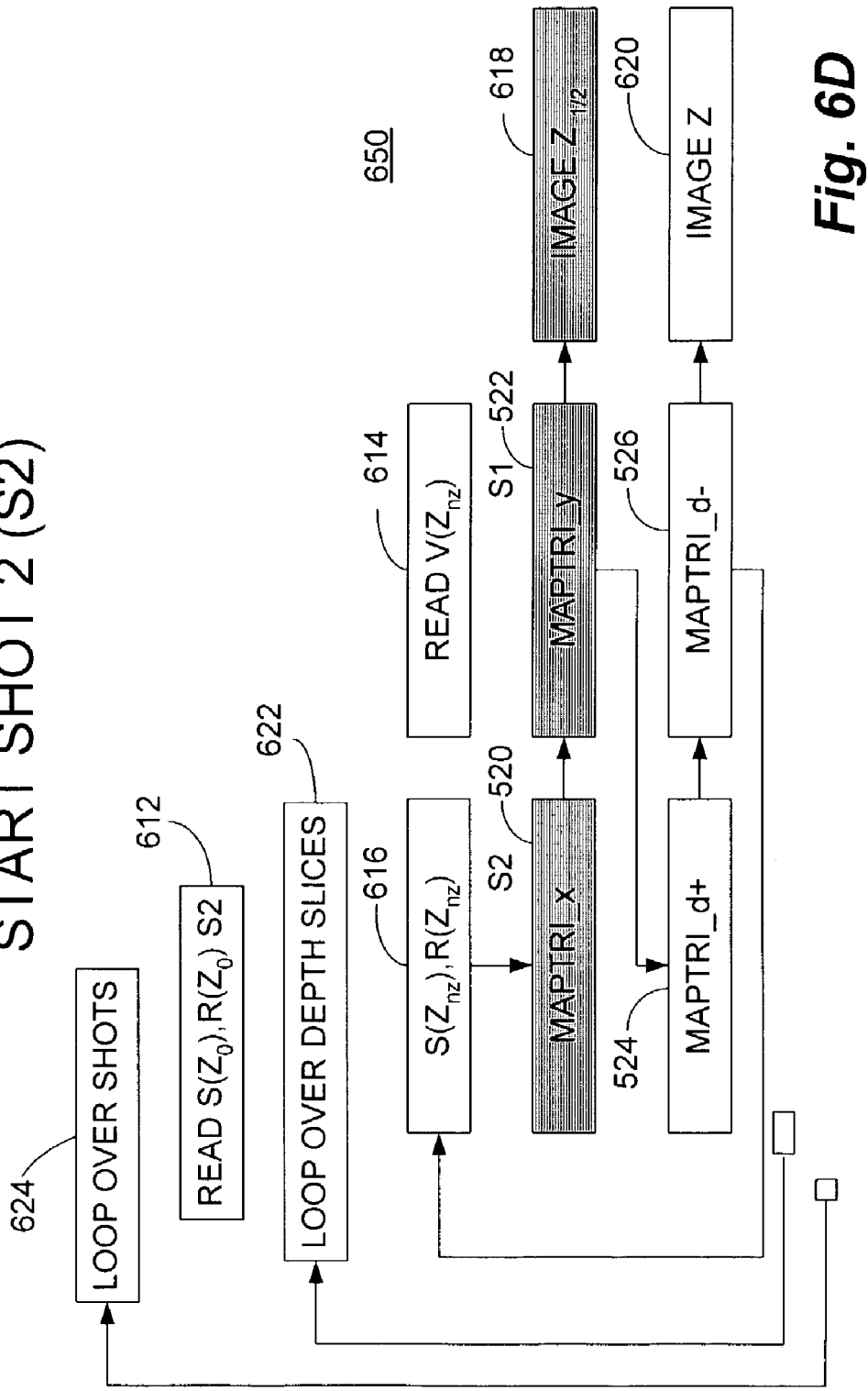
FIG. 6D illustrates the second step in the same computational process for the execution of the seismic imaging application of FIG. 6A in which a second shot (S2) is started.

With reference additionally now to FIG. 6D, the second step in the computational process 650 is shown at a point at which a second shot (S2) is started. Again, as indicated by the shaded blocks, the phase MAPTRI_x 520 is active for S2, the phase MAPTRI_y 522 is active for S1 and image $Z_{1/2}$ has been produced at step 618. As shown, adaptive processors in accordance with the disclosure of the present invention support computation pipelining in multiple dimensions and the parallelism in Z and shots is shown at step 612.

Figure 6E:
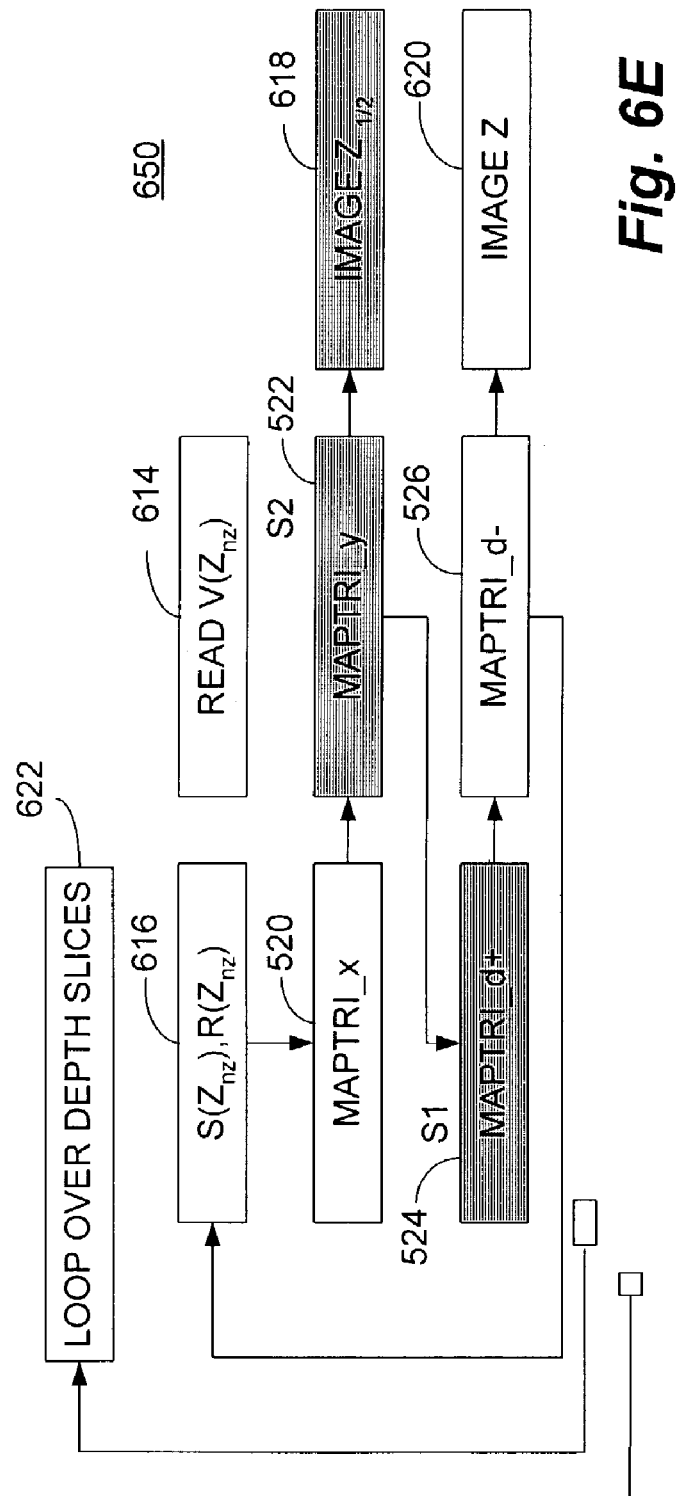
FIG. 6E illustrates the third step in the same computational process for the execution of the seismic imaging application of FIG. 6A in which the operation on the first and second shots is continued through compute.

With reference additionally now to FIG. 6E, the third step in the computational process 650 is shown in which the operation on the first and second shots is continued through compute. As indicated by the shaded blocks, the phase MAPTRI_d+ 524 is active for S1, the phase MAPTRI_y 522 is active for S2 and image $Z_{1/2}$ has been produced at step 618.

With reference additionally now to FIG. 6F, the fourth step in the computational process 650 is shown illustrating the subsequent operation on shots S1 and S2. The phase MAPTRI_d+ 524 is active for S2, the phase MAPTRI_d− 526 is active for S1 and image Z has been produced at step 620.

With reference additionally now to FIG. 6G, the fifth step in the computational process 650 is shown as followed by the continued downward propagation of shots S1 and S2 over all of the depth slices. The phase MAPTRI_x 520 is active for S1, the phase MAPTRI_d− 526 is active for S2 and image Z has been produced at step 620.

Figure 7B:
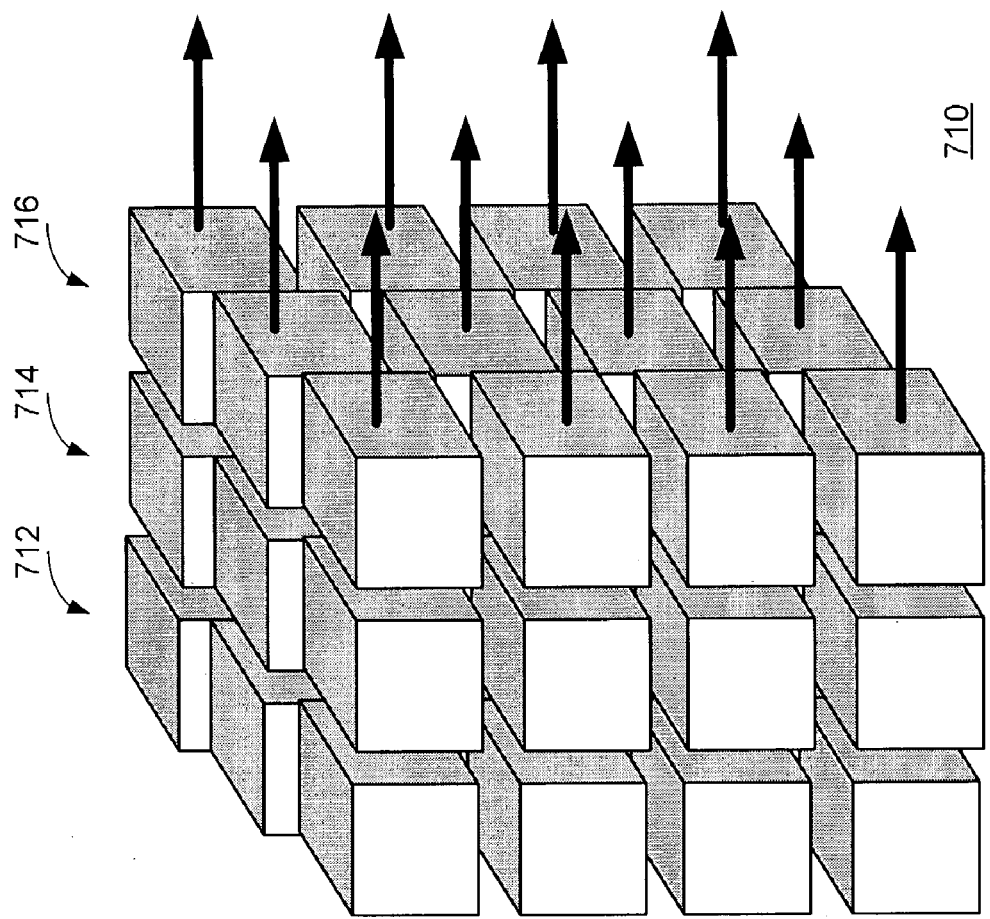
FIG. 7B illustrates the general computation of fluid flow properties in the reservoir simulation of the preceding figure which are communicated to neighboring cells.
Figure 7A:
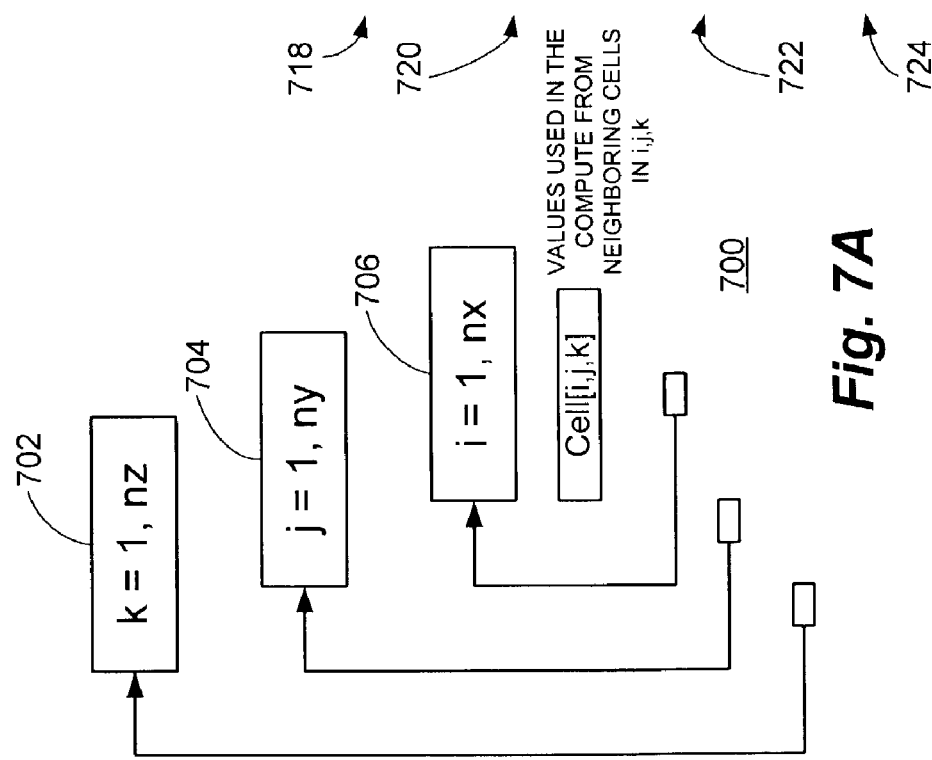
FIG. 7A illustrates a process for performing a representative systolic wavefront operation in the form of a reservoir simulation function also utilizing the parallelism available in the utilization of the adaptive processing techniques of the present invention.

With reference additionally now to FIG. 7A, a process 700 for performing a representative systolic wavefront operation in the form of a reservoir simulation function is shown which utilizes the parallelism available in the adaptive processing techniques of the present invention. The process 700 includes a "k" loop 702, "j" loop 704 and "i" loop 706 as shown.

With reference additionally now to FIG. 7B, the general computation of fluid flow properties in the reservoir simulation process 700 of the preceding figure are illustrated as values are communicated between a group of neighboring cells 710. The group of neighboring cells 710 comprises, in the simplified illustration shown, first, second and third walls of cells 712, 714 and 716 respectively. Each of the walls of cells includes a corresponding number of first, second, third and fourth rows 718, 720, 722 and 724 respectively.

As shown, the computation of fluid flow properties are communicated to neighboring cells 710 and, importantly, this computation can be scheduled to eliminate the need for data storage. In accordance with the technique of the present invention, a set of cells can reside in an adaptive processor and the pipeline of computation can extend across multiple adaptive processors. Communication overhead between multiple adaptive processors may be advantageously minimized through the use of MAP™ adaptive processor chain ports as disclosed in U.S. Pat. No. 6,339,819 issued on Jan. 15, 2002 for: "Multiprocessor With Each Processor Element Accessing Operands in Loaded Input Buffer and Forwarding Results to FIFO Output Buffer", assigned to SRC Computers, Inc., assignee of the present invention, the disclosure of which is herein specifically incorporated by this reference.

With reference additionally now to FIG. 7C, the creation of a systolic wall 712 of computation at Time Set 1 is shown. The systolic wall 712 has been started for a vertical wall of cells and communication of values between adjacent rows 718 through 724 in the vertical wall can occur without storing values to memory.

Figure 7D:
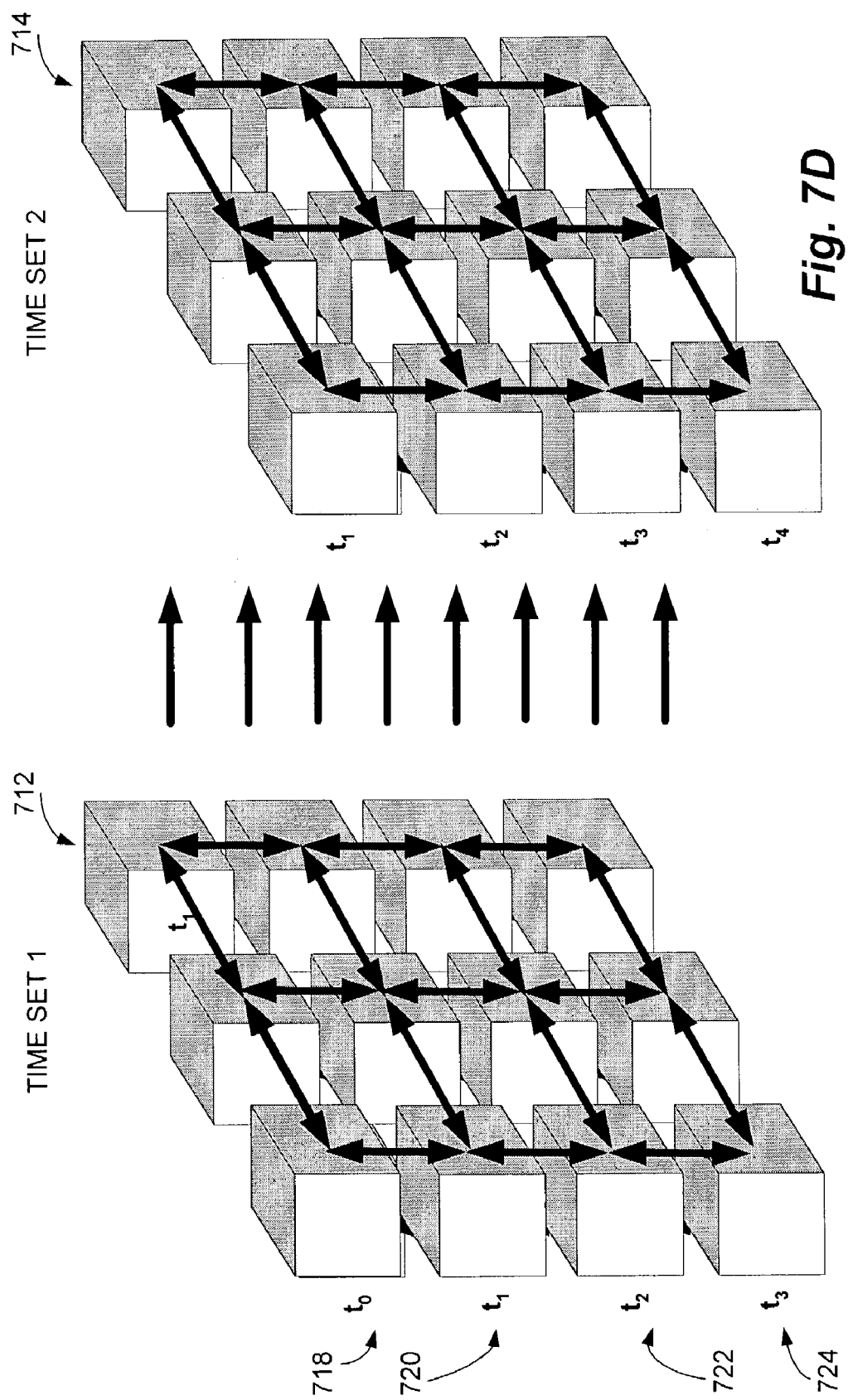
FIG. 7D is a follow on illustration of the creation of a systolic wall of computation at Time Set 1 and Time Set 2 showing how a second vertical wall of cells is started after the computation for cells in the corresponding row of the first wall has been completed.

With reference additionally now to FIG. 7D, a follow on illustration of the creation of a systolic wall 712 of computation at Time Set 1 and a second systolic wall 714 at Time Set 2 is shown. In operation, a second vertical wall of cells is started after the computation for cells in the corresponding row of the first wall has been completed. Thus, for example, at time $t_0$, the first row 718 of systolic wall 712 is completed and the results passed to the first row 718 of the second systolic wall 714. At time $t_1$, the second row 720 of the first systolic wall 712 and the first row 718 of the second systolic wall 714 are computed. Thereafter, at time $t_2$, the third row 722 of the first systolic wall 712 and the second row 720 of the second systolic wall 714 are computed. The process continues in this manner for all rows and all walls.

Figure 8A:
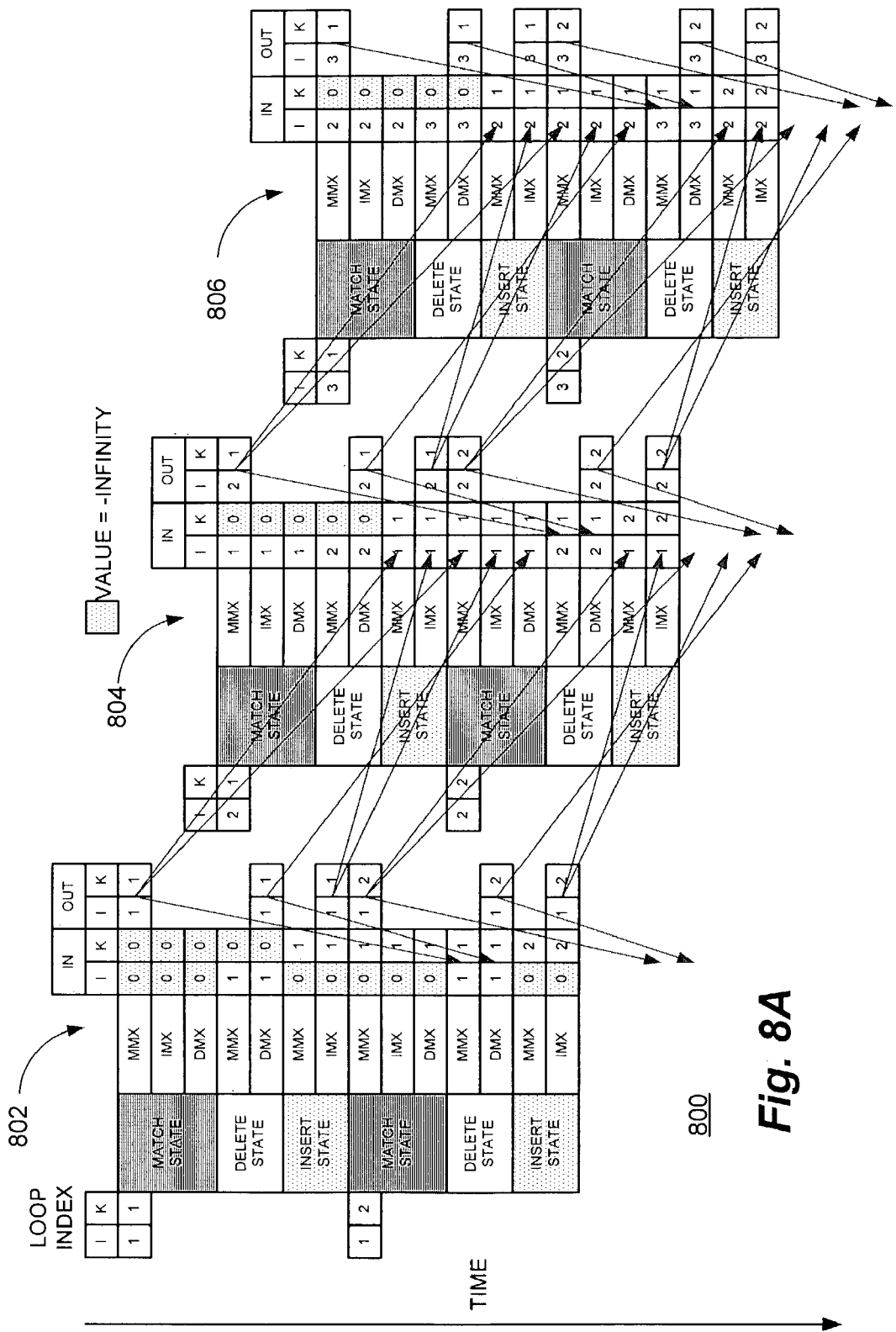
FIG. 8A illustrates yet another process for performing a representative systolic wavefront operation in the form of the systolic processing of bioinformatics also utilizing the parallelism available in the utilization of the adaptive processing techniques of the present invention.

With reference additionally now to FIG. 8A, yet another process 800 for performing a representative systolic wavefront operation is shown. The process 800 is in the form of the systolic processing of bioinformatics and also utilizes the parallelism available in the adaptive processing techniques of the present invention. As shown, systolic processing in the process 800 can pass previously computed data down within a column (e.g. one of columns 802, 804 and 806) as to subsequent columns as well (e.g. from column 802 to 804; from column 804 to 806 etc.) The computational advantage provided is the processing of the second column 804 can begin after only a few clock cycles following the start of the processing of the first column 802 to compute the first "match" state.

Figure 8B:
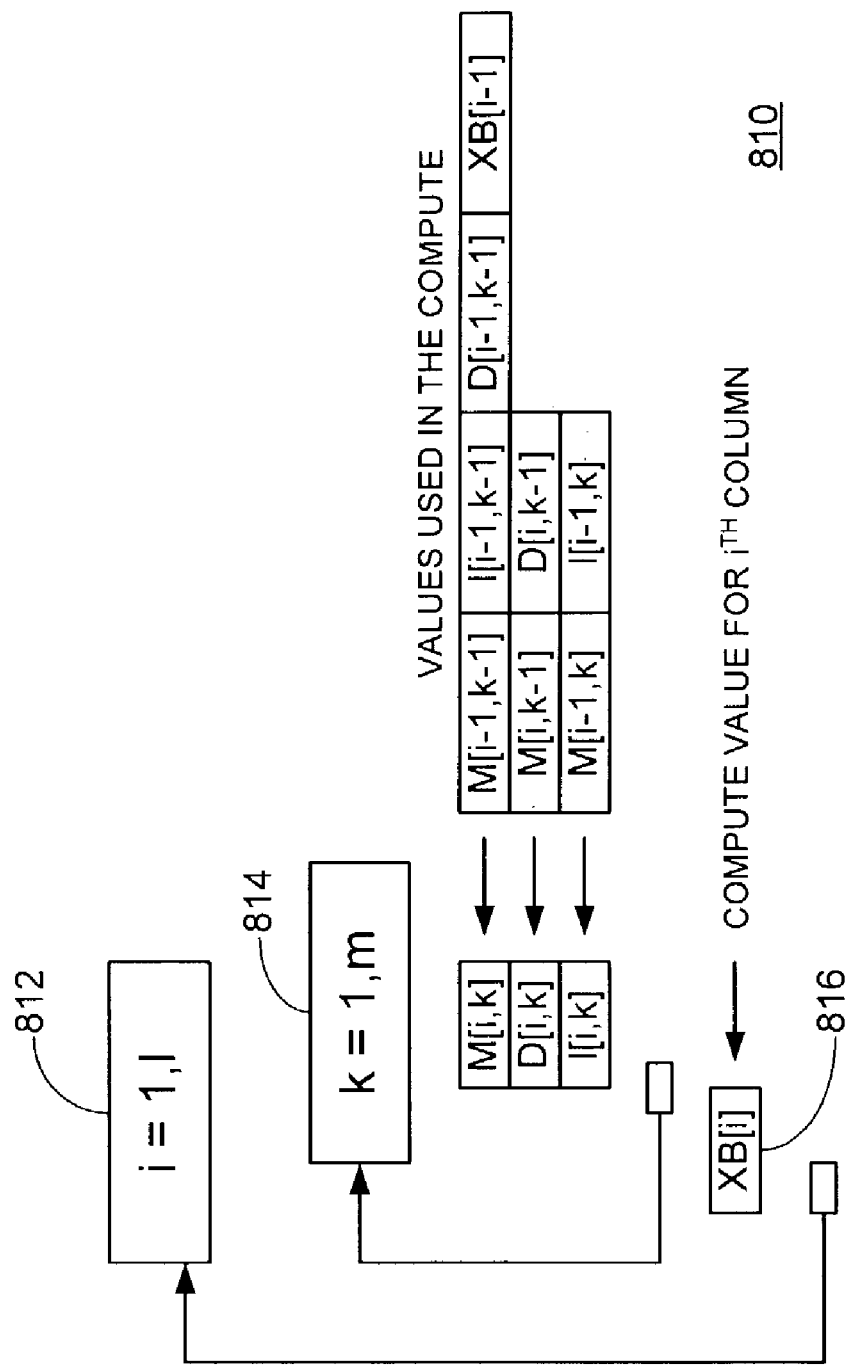
FIG. 8B illustrates a systolic wavefront processing operation which further incorporates a speculative processing strategy based upon an evaluation of the rate of change of XB.

With reference additionally now to FIG. 8B, a systolic wavefront processing operation 810 is shown. The processing operation 810, comprising "i" loop 812 and "k" loop 814 now further incorporates a speculative processing strategy based upon an evaluation of the rate of change of XB.

A straightforward systolic processing operation could be used for performing the operation 810 but for the problem inherent in the computation of XB as its value XB[i] 816 can not be known until the completion of the entire "k" loop 814. After evaluating the rate of change of XB, it was determined that a speculative processing strategy could be used for the problem. A normal systolic form is set up and the value of XB is held constant for the set of columns computed in the systolic set. At the bottom of each column, the value of XB[i] 816 is then computed.

Figure 8C:
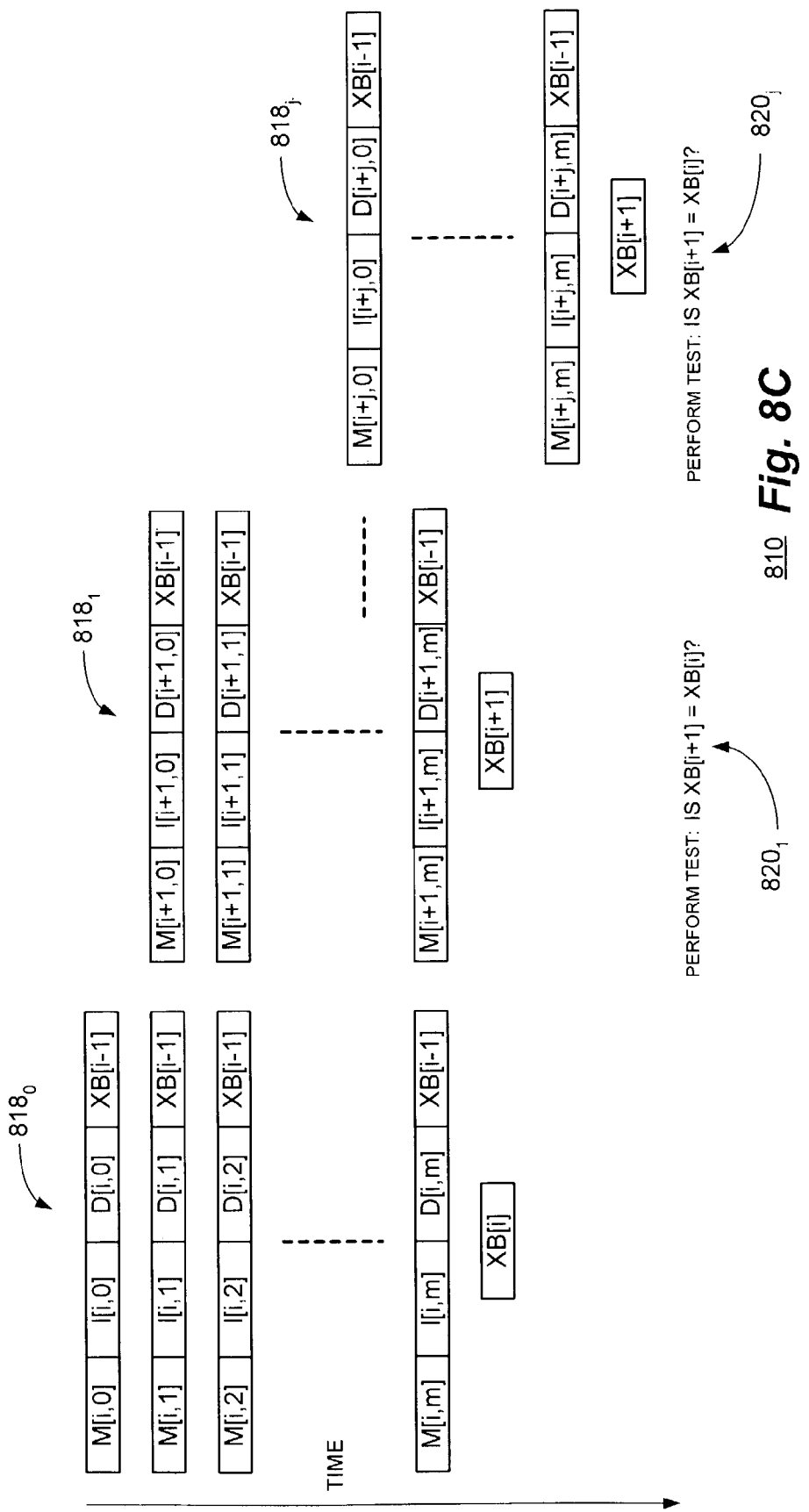
FIG. 8C is a further illustration of the systolic wavefront processing operation of the preceding figure incorporating speculative processing.

With reference additionally now to FIG. 8C, a further illustration of the systolic wavefront processing operation 810 incorporating speculative processing of the preceding figure is shown. The speculative processing includes "j" columns $818_0$ through $818_j$ as shown. Each of the columns 818 assumes that XB[i+j] has a constant value. A test is conducted at the bottom of each of the columns 818 to determine with the XB value changes as indicated at steps $820_1$ through $820_j$. If the value of XB changes at the i+n column, the process is then restarted at that column 818. Since the rate of change of XB is relatively slow, the "cost" of the compute operation can be greatly reduced.

Figure 9A:
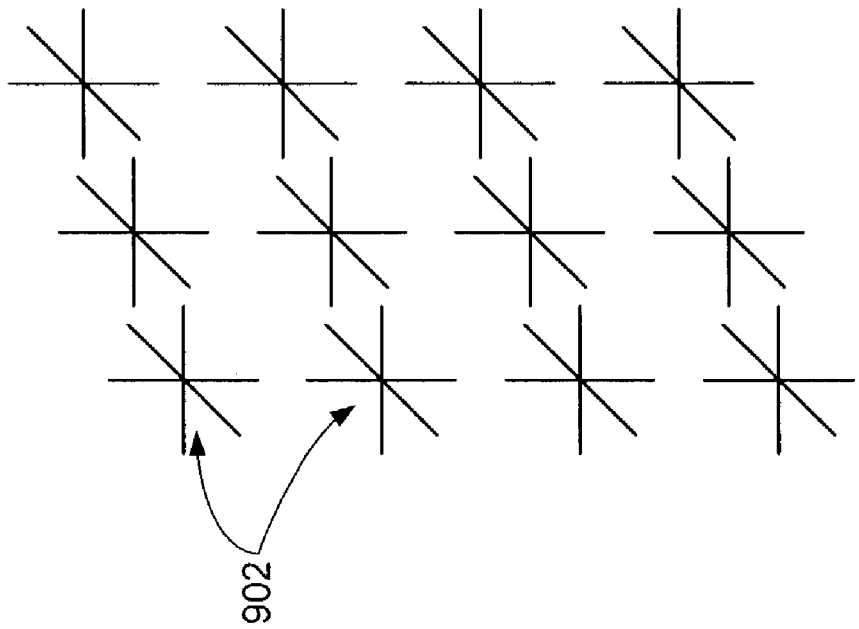
FIG. 9A illustrates still another process for performing a representative systolic wavefront operation in the form of structure codes calculating polynomials at grid intersections, again utilizing the parallelism available in the utilization of the adaptive processing techniques of the present invention.

With reference additionally now to FIG. 9A, another process 900 for performing a representative systolic wavefront operation is shown in the form of structure codes calculating polynomials at grid intersections 902. The process 900 advantageously utilizes the parallelism available in the adaptive processing techniques of the present invention.

Figures 9B, 9C:
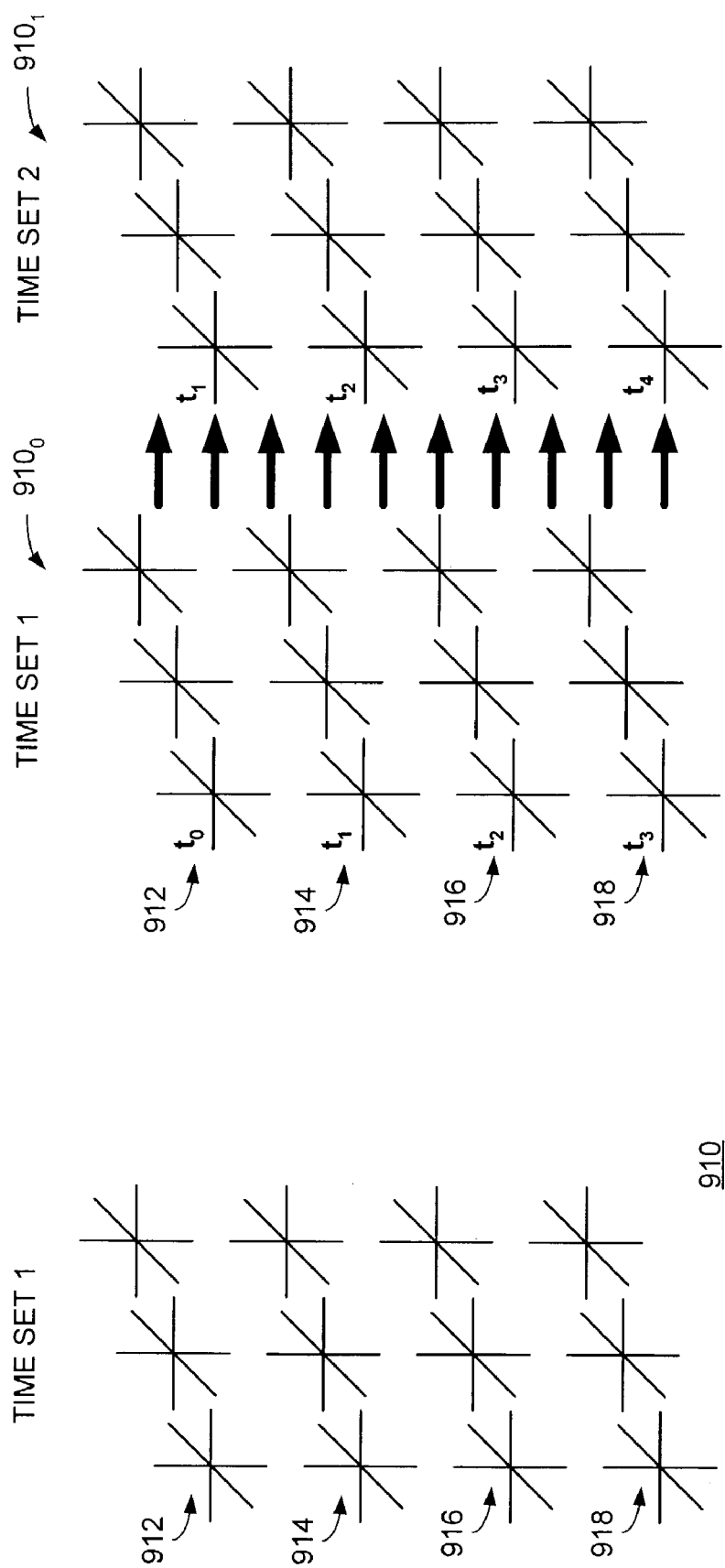
FIG. 9B illustrates the computation start for a vertical wall of grid points at Time Set 1 for a polynomial evaluation performed on grid intersections wherein calculations between rows are done in a stochastic fashion using values from a previous row.
FIG. 9C is a further illustration of the polynomial evaluation performed on grid intersections of the preceding figure wherein a second wall is started after the cells in the corresponding row of the first wall have been completed.

With reference additionally now to FIGS. 9B and 9C, the computation start for a vertical wall 910 of grid points at Time Set 1 is shown for a polynomial evaluation performed on grid intersections 902 (FIG. 9A) wherein calculations between rows 912, 914, 016 and 918 are done in a stochastic fashion using values from a previous row. As shown, a polynomial evaluation is performed on the grid intersections 902 such that a second wall $910_1$ is started after the cells in the corresponding row of the first wall $910_0$ have been completed.

As can be determined from the foregoing, the multi-adaptive processing systems and techniques for enhancing parallelism and performance of computational functions disclosed herein can be employed in a myriad of applications including multi-dimensional pipeline computations for seismic applications, search algorithms, information security, chemical and biological applications, filtering and the like as well as for systolic wavefront computations for fluid flow and structures analysis, bioinformatics etc. Some applications may also employ both the multi-dimensional pipeline and systolic wavefront methodologies.

Following are representative applications of the techniques for adaptive processor based computation disclosed herein:

Imaging

Seismic: These applications, typically used in the oil and gas exploration industries, process echo data to produce detailed analysis of subsurface features. The applications use data collected at numerous points and consisting of many repeated parameters. Due to this, these programs are ideal candidates to take advantage of parallel computing. In addition, because the results of the computation on one data point are used in the computation of the next, these programs will particularly benefit from the tight parallelism that can be found in the use of adaptive or reconfigurable processors.

Synthetic Aperture Radar ("SAR"): These applications are typically used in geographical imaging. The applications use data collected in swaths. Processing consists of repeated operations on data that has been sectioned in cells. These programs are also ideal candidates to take advantage of parallel computing and in particular to benefit from the tight parallelism that can be found in adaptive or reconfigurable processors.

JPEG Image compression: These applications partition an image into numerous blocks. These blocks then have a set of operations performed on them. The operations can be parallelized across numerous blocks. The combination of the set of operations and the parallelism will particularly benefit from the tight parallelism that can be found in adaptive or reconfigurable processors.

MPEG Image compression: These applications partition a frame into numerous blocks. These blocks then have a set of operations performed on them. The operations can be parallelized across numerous blocks. In addition, there are numerous operations that are performed on adjacent frames. The combination of the set of operations and the parallelism will particularly benefit from the tight parallelism that can be found in adaptive or reconfigurable processors.

Fluid Flow

Reservoir Simulation: These applications, also typically used in the oil and gas production industries, process fluid flow data in the oil and gas subsurface reservoirs to produce extraction models. The application will define a three dimensional ("3d") set of cells that contain the oil and gas reservoir. These programs are ideal candidates to take advantage of parallel or adaptive computing because there are repeated operations on each cell. In addition, information computed for each cell is then passed to neighboring cells. These programs will particularly benefit from the tight parallelism that can be found in adaptive or reconfigurable processors.

Weather prediction: Such an application will partition the forecast area into logical grid cells. The computational algorithms will then perform calculations that have polynomials that have nodes associated with the grid cells. These programs are ideal candidates to take advantage of adaptive or parallel computing because there are repeated operations on each cell associated with the set of times computed in the forecast.

Automotive: These applications investigate the aerodynamics of automobile or other aerodynamic structures. The application generally divides the space surrounding the automobile structure into logical cells that are associated with nodes in computational polynomials. These programs are ideal candidates to take advantage of adaptive or parallel computing because there are repeated operations on each cell associated with the set of wind velocities computed in the forecast. These programs will benefit from the tight parallelism that can be found in adaptive or reconfigurable processors.

Aerospace: These applications investigate the aerodynamics of aerospace/airplane structures. The application divides the space surrounding the aerospace/airplane structure into logical cells that are associated with nodes in computational polynomials. These programs are ideal candidates to take advantage of parallel computing because there are repeated operations on each cell associated with the set of wind velocities computed in the forecast. These programs will benefit from the tight parallelism that can be found in adaptive or reconfigurable processors.

Plastic Injection Molding: These applications investigate the molding parameters of injecting liquid plastic into molds. The application divides the space inside the mold into logical cells that are also associated with nodes in computational polynomials. These programs are ideal candidates to take advantage of parallel computing because there are repeated operations on each cell associated with the set of injection parameters. These programs will benefit from the tight parallelism that can be found in adaptive or reconfigurable processors.

Structures

Crash Analysis: These applications are typically used in the automotive or aviation industry. The application will partition the entire automobile into components. These components are then subdivided into cells. The application will analyze the effect of a collision on the structure of the automobile. These programs are ideal candidates for parallel computing because there are repeated operations on each cell and they receive computed information from their neighboring cells. These programs will benefit from the tight parallelism that can be found in adaptive or reconfigurable processors.

Structural Analysis: These applications investigate the properties of structural integrity. The application divides the structure into logical cells that are associated with nodes in computational polynomials. These programs are ideal candidates to take advantage of parallel computing because there are repeated operations on each cell associated with load and stress. These programs will benefit from the tight parallelism that can be found in adaptive or reconfigurable processors.

Search Algorithms

Image searches: These applications are typically used in the security industry for fingerprint matching, facial recognition and the like. The application seeks matches in either a collection of subsets of the total image or the total image itself. The process compares pixels of the model to pixels of a record from an image database. These programs are ideal candidates for parallel computing because of the correlation of comparison results that exist for each pixel in the subsets or entire image. These programs will benefit from the tight parallelism that can be found in adaptive or reconfigurable processors.

Data mining: These applications are typically used in commercial market spaces. The application seeks matches in a set of search information (e.g. character strings) in each record in a database. The application then produces a match correlation for all data records. A match correlation is produced from the comparison results for each set of search information with all characters in a database record. These programs are ideal candidates for parallel computing because of the repeated comparison operations that exist all character comparisons of the set of search information with each character in the database record. These programs will benefit from the tight parallelism that can be found in adaptive or reconfigurable processors.

Finance

Financial modeling: The application creates numerous strategies for each decision step in the modeling process. The results of a computational step are feed into another set of strategies for subsequence modeling steps. These programs are ideal candidates to take advantage of parallel computing because there are repeated operations on each strategy within a modeling step. These programs will benefit from the tight parallelism that can be found in adaptive or reconfigurable processors.

Information Security

Encryption/Decryption: The application applies an algorithm that converts the original data into an encrypted, or "protected", form. The process is applied to each set of N bits in the original data. Decryption reverses the process to deliver the original data. These programs are ideal candidates for parallel computing because there are repeated operations on each N bits of data. These programs will benefit from the tight parallelism that can be found in adaptive or reconfigurable processors.

Chemistry/Biology

Genetic pattern matching: These applications are typically used in the bioinformatics industry. The application looks for matches of a particular genetic sequence (or model) to a database of genetic records. The application compares each character in the model to the characters in genetic record. These programs are ideal candidates for parallel computing because of the repeated comparison operations that exist for all character comparisons of the model with each character in the genetic record. These programs will benefit from the tight parallelism that can be found in adaptive or reconfigurable processors.

Protein Folding: These applications are typically used by pharmaceutical companies. The application investigates the dynamics of the deformation of the protein structure. The application uses a set of equations which are recomputed at various "time" intervals to model the protein folding. These programs are ideal candidates for parallel computing because of the repeated computations on a large set of time intervals in the modeling sequence. These programs will benefit from the tight parallelism that can be found in adaptive or reconfigurable processors Organic structure interaction: These applications are typically used by chemical and drug companies. The application investigates the dynamics of organic structures as they are interacting. The application uses a set of equations which are recomputed at various "time" intervals to model how the organic structure interact. These programs are ideal candidates for parallel computing because of the repeated computations on a large set of time intervals in the modeling sequence. These programs will benefit from the tight parallelism that can be found in adaptive or reconfigurable processors Signals Filtering: Applications often utilize filtering techniques to "clean-up" a recorded data sequence. This technique is utilized in a wide variety of industries. The application generally applies a set of filter coefficients to each data point in the recorded sequence. These programs are ideal candidates for parallel computing because of the repeated computations to all data points in the sequence and all sequences. These programs will benefit from the tight parallelism that can be found in adaptive or reconfigurable processors.

While there have been described above the principles of the present invention in conjunction with specific, exemplary applications for the use of adaptive processor-based systems in the implementation of multi-dimensional pipeline and systolic wavefront computations, it is to be clearly understood that the foregoing descriptions are made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features. disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

The invention claimed is:

1. A method for data processing in a reconfigurable computing system, the reconfigurable computing system comprising at least one reconfigurable processor, the reconfigurable processor comprising a plurality of functional units, said method comprising:

transforming an algorithm into a calculation that is systolically implemented by said reconfigurable computing system at the at least one reconfigurable processor;

instantiating at least two of said functional units at the at least one reconfigurable processor to perform said calculation wherein only functional units needed to solve the calculation are instantiated and wherein each instantiated functional unit at the at least one reconfigurable processor interconnects with each other instantiated functional unit at the at least one reconfigurable processor based on reconfigurable routing resources within the at least one reconfigurable processor as established at instantiation, and wherein systolically linked lines of code of said calculation are instantiated as clusters of functional units within the at least one reconfigurable processor;

utilizing a first of said instantiated functional units to operate upon a subsequent data dimension of said calculation forming a first computational loop; and substantially concurrently utilizing a second of said instantiated functional units to operate upon a previous data dimension of said calculation forming a second computational loop wherein said systolic implementation of said calculation enables said first computational loop and said second computational loop execute concurrently and pass computed data seamlessly between said computational loops.

2. The method of claim 1 wherein said subsequent and previous data dimensions of said calculation comprise multiple vectors in said calculation.

3. The method of claim 1 wherein said subsequent and previous data dimensions of said calculation comprise multiple planes in said calculation.

4. The method of claim 1 wherein said subsequent and previous data dimensions of said calculation comprise multiple time steps in said calculation.

5. The method of claim 1 wherein said subsequent an previous data dimensions of said calculation comprise multiple grid points in said calculation.

6. The method of claim 1 wherein said calculation comprises a seismic imaging calculation.

7. The method of claim 1 wherein said calculation comprises a synthetic aperture radar imaging calculation.

8. The method of claim 1 wherein said calculation comprises a JPEG image compression calculation.

9. The method of claim 1 wherein said calculation comprises an MPEG image compression calculation.

10. The method of claim 1 wherein said calculation comprises a fluid flow calculation for a reservoir simulation.

11. The method of claim 1 wherein said calculation comprises a fluid flow calculation for weather prediction.

12. The method of claim 1 wherein said calculation comprises a fluid flow calculation for automotive applications.

13. The method of claim 1 wherein said calculation comprises a fluid flow calculation for aerospace applications.

14. The method of claim 1 wherein said calculation comprises a fluid flow calculation for an injection molding application.

15. The method of claim 1 wherein instantiating includes establishing a stream communication connection between functional units.

16. The method of claim 1 wherein said calculation is comprises a structures calculation for structural analysis.

17. The method of claim 1 wherein said calculation comprises a search algorithm for an image search.

18. The method of claim 1 wherein said calculation comprises a search algorithm for data mining.

19. The method of claim 1 wherein said calculation comprises a financial modeling application.

20. The method of claim 1 wherein said calculation comprises an encryption algorithm.

21. The method of claim 1 wherein said calculation comprises a genetic pattern matching function.

22. The method of claim 1 wherein said calculation comprises a protein folding function.

23. The method of claim 1 wherein said calculation comprises an organic structure interaction function.

24. The method of claim 1 wherein said calculation comprises a signal filtering application.

25. A method for data processing in a reconfigurable computing system, the reconfigurable computing system comprising at least one reconfigurable processor comprising a plurality of functional units, said method comprising:

transforming an algorithm into a calculation that is systolically implemented by said reconfigurable computing system at the at least one reconfigurable processor wherein systolically linked lines of code of said calculation are instantiated as walls of functional units within the at least one reconfigurable processor;

defining a first systolic wall comprising rows of cells forming a subset of said plurality of functional units;

computing at the at least one reconfigurable processor a value at each of said cells in at least a first row of said first systolic wall substantially concurrently;

communicating said values between cells in said first row of said cells to produce updated values, wherein communicating said values is based on reconfigurable routing resources within the at least one reconfigurable processor;

communicating said updated values substantially concurrently to a second row of said first systolic wall, wherein communicating said updated values is based on reconfigurable routing resources within the at least one reconfigurable processor; and communicating said updated values substantially concurrently to a first row of a second systolic wall of rows of cells in said subset of said plurality of functional units, wherein communicating said updated values is based on reconfigurable routing resources within the at least one reconfigurable processor and wherein said first systolic wall of rows of cells and said second wall of rows of systolic cells execute substantially concurrently and pass computed data seamlessly between said systolic walls.

26. The method of claim 25 wherein said values correspond to vectors in a computation.

27. The method of claim 25 wherein said values correspond to planes in a computation.

28. The method of claim 25 wherein said values correspond to time steps in a computation.

29. The method of claim 25 wherein said values correspond to grid points in a computation.

30. The method of claim 25 wherein said step of communicating said updated values to a second row of said first systolic wall is carried out without storing said updated values in an extrinsic memory.

31. The method of claim 25 wherein said values correspond to a seismic imaging calculation.

32. The method of claim 25 wherein said values correspond to a synthetic aperture radar imaging calculation.

33. The method of claim 25 wherein said values correspond to a JPEG image compression calculation.

34. The method of claim 25 wherein said values correspond to an MPEG image compression calculation.

35. The method of claim 25 wherein said values correspond to a fluid flow calculation for a reservoir simulation.

36. The method of claim 25 wherein said values correspond to a fluid flow calculation for weather prediction.

37. The method of claim 25 wherein said values correspond to a fluid flow calculation for automotive applications.

38. The method of claim 25 wherein said values correspond to a fluid flow calculation for aerospace applications.

39. The method of claim 25 wherein said values correspond to a fluid flow calculation for an injection molding application.

40. The method of claim 25 wherein defining includes establishing a stream communication connection between functional units and wherein only functional units needed to solve the calculations are instantiated.

41. The method of claim 25 wherein said values correspond to a structures calculation for structural analysis.

42. The method of claim 25 wherein said values correspond to a search algorithm for an image search.

43. The method of claim 25 wherein said values correspond to a search algorithm for data mining.

44. The method of claim 25 wherein said values correspond to a financial modeling application.

45. The method of claim 25 wherein said values correspond to an encryption algorithm.

46. The method of claim 25 wherein said values correspond to a genetic pattern matching function.

47. The method of claim 25 wherein said values correspond to a protein folding function.

48. The method of claim 25 wherein said values correspond to an organic structure interaction function.

49. The method of claim 25 wherein said values correspond to a signal filtering application.

50. The method of claim 25 wherein said reconfigurable computing system comprises at least one microprocessor.

51. A method for data processing in a reconfigurable computing system, the reconfigurable computer system comprising at least one reconfigurable processor comprising a plurality of functional units, said method comprising:

transforming an algorithm into a calculation that is systolically implemented by said reconfigurable computing system at the at least one reconfigurable processor wherein systolically linked lines of code of said calculation are instantiated as subsets of said plurality of functional units within the at least one reconfigurable processor forming columns of said calculation;

performing said calculation at the at least one reconfigurable processor by said subsets of said plurality of functional units to produce computed data;

exchanging said computed data between a first column of said calculation and a next column in said calculation, wherein said exchanging is based on reconfigurable routing resources within the at least one reconfigurable processor and wherein execution of said subsets of said plurality of function units occurs concurrently and said computed data is seamlessly passed between said first column of said calculation and said second column of said calculation;

evaluating a rate of change in at least one variable for each of said columns in said calculation;

continuing said calculation when said variable does not change for a particular column of said calculation; and restarting said calculation at said column of said calculation where said variable does change.

52. The method of claim 51 wherein how many functional units comprise the subset and functional type of each functional unit in said subset is based on the calculation.

* * * * *